(12) United States Patent
Tan et al.

(10) Patent No.: US 12,466,514 B2
(45) Date of Patent: *Nov. 11, 2025

(54) OPERATING DEVICE FOR HUMAN-POWERED VEHICLE

(71) Applicant: Shimano Inc., Osaka (JP)

(72) Inventors: Yong Liang Steve Tan, Osaka (JP); Jun Wen Ng, Singapore (SG)

(73) Assignee: Shimano Inc., Osaka (JP)

( * ) Notice: Subject to any disclaimer, the term of this patent is extended or adjusted under 35 U.S.C. 154(b) by 16 days.

This patent is subject to a terminal disclaimer.

(21) Appl. No.: 18/587,164

(22) Filed: Feb. 26, 2024

(65) Prior Publication Data

US 2024/0359766 A1     Oct. 31, 2024

(30) Foreign Application Priority Data

Apr. 26, 2023    (DE)  .................... 10 2023 110 752.6

(51) Int. Cl.
     *B62L 3/02*         (2006.01)
     *B62K 23/06*      (2006.01)

(52) U.S. Cl.
     CPC .............. *B62L 3/023* (2013.01); *B62K 23/06* (2013.01)

(58) Field of Classification Search
     CPC .... B62M 25/04; B62M 25/08; B62M 25/045; B62L 3/023
     See application file for complete search history.

(56) References Cited

U.S. PATENT DOCUMENTS

| | | | |
|---|---|---|---|
| 8,714,322 B2 | 5/2014 | Dunlap et al. | |
| 9,056,597 B2 | 6/2015 | Fukao | |
| 10,183,723 B2 * | 1/2019 | Swanson | B62K 23/06 |
| 10,189,538 B2 * | 1/2019 | Nishino | B62M 25/08 |
| 10,507,883 B2 | 12/2019 | Okubo et al. | |
| 10,988,209 B1 | 4/2021 | Lunman et al. | |
| 12,030,580 B2 * | 7/2024 | Obuchi | B60T 7/102 |

* cited by examiner

*Primary Examiner* — Thomas C Diaz

(74) *Attorney, Agent, or Firm* — Global IP Counselors LLP; David Tarnoff

(57) ABSTRACT

An operating device is provided for a human-powered vehicle. The operating device includes a base, an operating member, a hydraulic unit and an intermediate member. The operating member is pivotally mounted to the base about a first pivot axis. The hydraulic unit is operated by the operating member to move a piston in a cylinder bore. The intermediate member is movably coupled to the operating member to move the piston from an initial position to an actuated position in response to operation of the operating member. The piston is closer to a distal end of the base where the piston is at an initial position than where the piston is at an actuated position. The cylinder bore is at least partly closer to the distal end than the first pivot axis. The intermediate member is at least partly closer to the distal end than the first pivot axis.

19 Claims, 20 Drawing Sheets

OPERATING DEVICE FOR HUMAN-POWERED VEHICLE

CROSS-REFERENCE TO RELATED APPLICATIONS

This application claims priority to German Patent Application No. 10 2023 110 752.6, filed on Apr. 26, 2023. The entire disclosure of German Patent Application No. 10 2023 110 752.6 is hereby incorporated herein by reference.

BACKGROUND

Technical Field

This disclosure generally relates to an operating device for a human-powered vehicle.

Background Information

Generally, a human-powered vehicle has one or more components that are operated by a rider using one or more operating devices for operating one or more the components. There are many types of operating devices. For example, the operating device can be mechanically, hydraulically and/or electrically connected to the component(s). Typically, a human-powered vehicle has a handlebar with one operating device provided at each side of the handlebar so that the rider's right hand can operate one of the operating devices and the rider's left hand can operate the other operating device. Some human-powered vehicles have front and rear transmission devices and front and rear brake devices. In such a case, one of the operating devices operates one of transmission devices and one of the brake devices, while the other operating devices operate the other transmission device and the other brake device. Some operating devices use a single operating member to perform both upshifting operations and downshifting operations, while other operating devices use a first operating member to perform upshifting operations and a second operating member to perform downshifting operations. Also, some operating devices integrate braking into one of the operating members. In the case of a road bicycle with a drop handlebar, the operating device is provided with a lever for performing shifting and braking. One example of such an operating device is disclosed in U.S. Pat. No. 9,056,597 (assigned to Shimano, Inc).

SUMMARY

Generally, the present disclosure is directed to various features of an operating device for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, an operating device is provided for a human-powered vehicle. The operating device basically comprises a base, an operating member, a hydraulic unit and an intermediate member. The base includes a first end, a second end, and a grip portion. The first end is configured to be coupled to the handlebar. The second end is opposite to the first end. The grip portion is provided between the first end and the second end. The operating member is pivotally mounted to the base about a first pivot axis. The hydraulic unit is provided to the base and operated by the operating member. The hydraulic unit includes a cylinder bore and a piston movably provided in the cylinder bore. The intermediate member is movably coupled to the operating member to move the piston relative to the base from an initial position to an actuated position in response to a movement of the operating member from a rest position to an operating position. The piston is closer to the second end where the piston is at the initial position than where the piston is at the actuated position. The cylinder bore is at least partly closer to the second end than the first pivot axis. The intermediate member is at least partly closer to the second end than the first pivot axis.

With the operating device according to the first aspect, it is possible to improve the ergonomics and aerodynamics of the operating device.

In accordance with a second aspect of the present disclosure, the operating device according to the first aspect is configured so that the intermediate member is pivotally mounted to the base about a second pivot axis.

With the operating device according to the second aspect, the ergonomics and aerodynamics of the operating device can be reliably obtained.

In accordance with a third aspect of the present disclosure, the operating device according to the second aspect is configured so that the second pivot axis is closer to the second end than the first pivot axis.

With the operating device according to the third aspect, the ergonomics and aerodynamics of the operating device can be further reliably obtained.

In accordance with a fourth aspect of the present disclosure, the operating device according to the second aspect or the third aspect is configured so that the intermediate member includes a pivot portion, a first arm portion and a second arm portion. The pivot portion is pivotally mounted to the base. The first arm portion extends from the pivot portion in a first direction. The second arm portion extends from the pivot portion in a second direction that is different from the first direction as viewed in a direction parallel to the first pivot axis.

With the operating device according to the fourth aspect, the ergonomics and aerodynamics of the operating device can be further reliably obtained.

In accordance with a fifth aspect of the present disclosure, the operating device according to the fourth aspect is configured so that the first arm portion is operatively coupled to the operating member, and the second arm portion is operatively coupled to the piston.

With the operating device according to the fifth aspect, the movement of the operating member can be reliably transmitted to the piston.

In accordance with a sixth aspect of the present disclosure, the operating device according to the fourth aspect or the fifth aspect is configured so that the first arm portion is operatively coupled to the operating member by a cam structure.

With the operating device according to the sixth aspect, the movement of the operating member can be reliably transmitted to the piston.

In accordance with a seventh aspect of the present disclosure, the operating device according to any one of the fourth aspect to the sixth aspect is configured so that the second arm portion is operatively coupled to the piston by a push rod.

With the operating device according to the seventh aspect, the movement of the operating member can be reliably transmitted to the piston.

In accordance with an eighth aspect of the present disclosure, the operating device according to any one of the fourth aspect to the seventh aspect is configured so that the first arm portion extends towards the first end where the piston is at the initial position, and the second arm portion extends towards the second end where the piston is at the initial position.

With the operating device according to the eighth aspect, the ergonomics and aerodynamics of the operating device can be further reliably obtained.

In accordance with a ninth aspect of the present disclosure, the operating device according to any one of the first aspect to the eighth aspect is configured so that the operating member includes a cam surface, and the intermediate member includes a follower configured to contact the cam surface such that the movement of the operating member from the rest position to the operating position cause the intermediate member to move the piston from the initial position to the actuated position with a variable lever stroke to piston stroke ratio.

With the operating device according to the ninth aspect, pad clearance and power control of a brake device can be improved using the operating device.

In accordance with a tenth aspect of the present disclosure, the operating device according to the ninth aspect is configured so that the follower includes a cam roller.

With the operating device according to the tenth aspect, the movement of the operating member can be efficiently transmitted to the piston.

In accordance with an eleventh aspect of the present disclosure, the operating device according to any one of the first aspect to the tenth aspect further comprises a first biasing element configured to bias the piston towards the initial position.

With the operating device according to the eleventh aspect, the piston can be reliably maintained in the initial position until the operating member is operated.

In accordance with a twelfth aspect of the present disclosure, the operating device according to any one of the first aspect to the eleventh aspect further comprises a second biasing element configured to bias the operating member towards the operating position.

With the operating device according to the twelfth aspect, play in the parts connecting the operating member to the piston can be effectively eliminated.

In accordance with a thirteenth aspect of the present disclosure, the operating device according to the twelfth aspect is configured so that the second biasing element has a lower biasing force than the first biasing element.

With the operating device according to the thirteenth aspect, the operating member can be reliably maintained in the rest position and the piston can be reliably maintained in the initial position until the operating member is operated.

In accordance with a fourteenth aspect of the present disclosure, the operating device according to any one of the first aspect to the thirteenth aspect is configured so that the cylinder bore has a center longitudinal axis that is offset from a center plane to a first lateral side, where the center plane bisects the first end in a widthwise direction of the base as viewed in a direction parallel to the center plane.

With the operating device according to the fourteenth aspect, an internal hydraulic fluid route can be improved.

In accordance with a fifteenth aspect of the present disclosure, the operating device according to the fourteenth aspect is configured so that the base includes an outlet port and a hydraulic passageway connecting the outlet port to the cylinder bore. The outlet port and the hydraulic passageway are located on the first lateral side.

With the operating device according to the fifteenth aspect, the internal hydraulic fluid route can be further improved.

In accordance with a sixteenth aspect of the present disclosure, the operating device according to any one of the first aspect to the fifteenth aspect further comprises a first pivot axle, a second pivot axle and a brace. The first pivot axle pivotally supports the operating member to the base. The second pivot axle pivotally supports the intermediate member to the base. The brace is coupled to the first pivot axle and the second pivot axle.

With the operating device according to the sixteenth aspect, the stiffness of the base can be increased for improved operating performance of the operating member.

In accordance with a seventeenth aspect of the present disclosure, the operating device according to the sixteenth aspect is configured so that the base is made of a non-metallic material, and the brace is made of a metallic material.

With the operating device according to the seventeenth aspect, the overall weight of the operating device can be minimized while still maintaining sufficient stiffness of the base to maintain operating performance of the operating member.

In accordance with an eighteenth aspect of the present disclosure, the operating device according to any one of the first aspect to the seventeenth aspect is configured so that the operating member is configured to operate a brake device while the operating member in the operating position.

With the operating device according to the eighteenth aspect, the operating member can be used to operate a brake device.

In accordance with a nineteenth aspect of the present disclosure, the operating device according to any one of the first aspect to the eighteenth aspect further comprises an adapter through which the operating member is pivotally coupled to the base about the first pivot axis.

With the operating device according to the nineteenth aspect, the operating member can be easily coupled to the base member using an adapter.

In accordance with a twentieth aspect of the present disclosure, the operating device according to the nineteenth aspect further comprises a shift unit provided to the base and operated by the operating member being pivoted relative to the adapter about a shift pivot axis.

With the operating device according to the twentieth aspect, the operating member can be used to operate a transmission device.

Also, other objects, features, aspects and advantages of the disclosed operating device will become apparent to those skilled in the art from the following detailed description, which, taken in conjunction with the annexed drawings, discloses preferred embodiments of the operating device.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
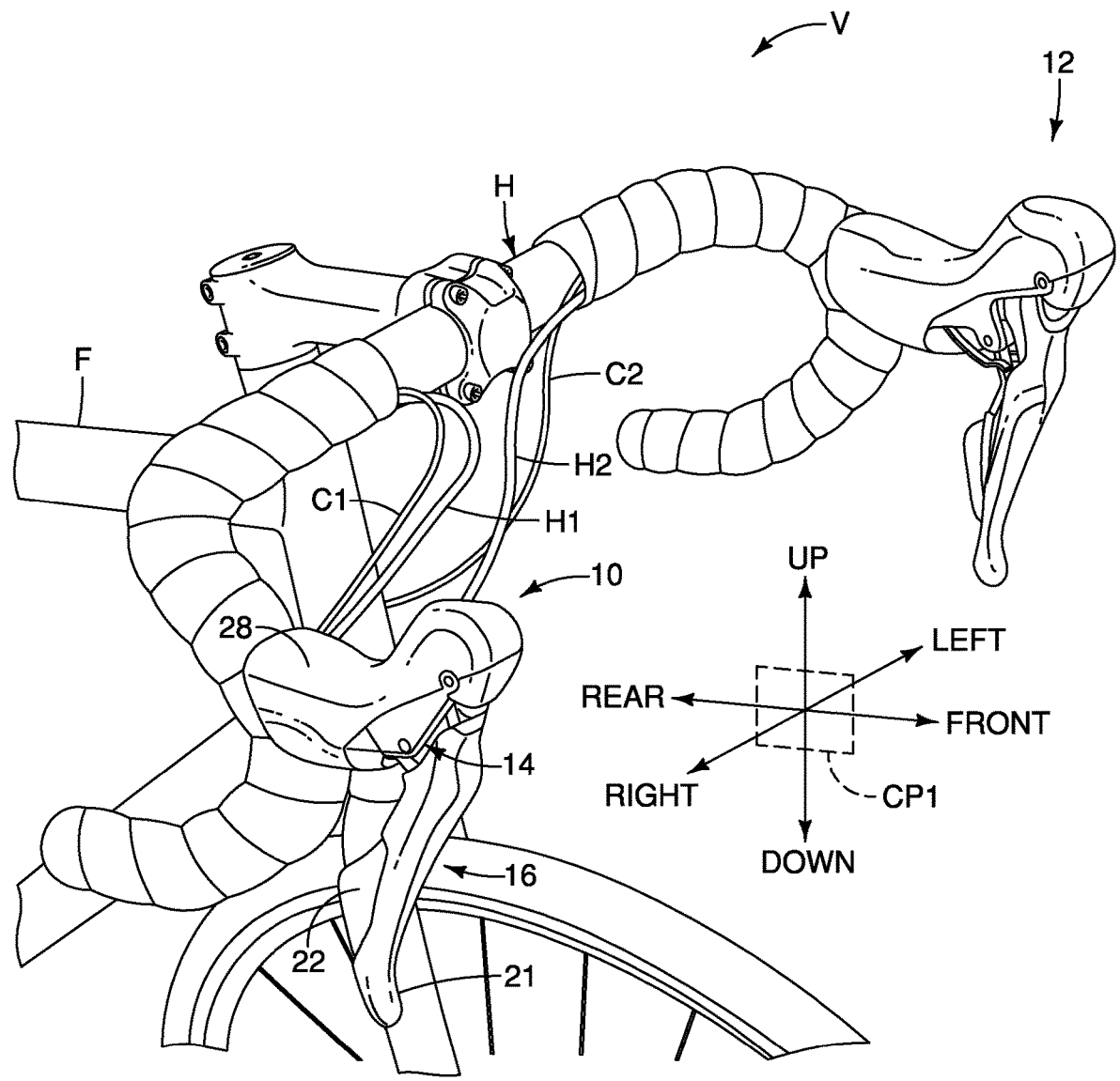
FIG. 1 is a perspective view of a handlebar area of a human-powered vehicle (e.g., a bicycle) having a drop handlebar that is equipped with a pair of operating devices in accordance one illustrative embodiment.

Referring initially to FIG. 1, a human-powered vehicle V is partially illustrated in which an operating device 10 is provided to the human-powered vehicle V in accordance with a first embodiment. In the first embodiment, the human-powered vehicle V is a bicycle and the operating device 10 is a bicycle operating device. As seen in FIG. 1, the operating device 10 is coupled to a handlebar H in an installed state. Here, the handlebar H is a drop handlebar that is pivotally coupled to a frame F of the human-powered vehicle V. The human-powered vehicle V has a vehicle center plane CP1 vertically bisecting the frame F of the human-powered vehicle V in a longitudinal direction (a front to rear direction). The vehicle center plane CP1 passes through a center of the frame F in a width direction (a left to right direction) of the frame F. Thus, the vehicle center plane CP1 separates a left side of the human-powered vehicle V from a right side of the human-powered vehicle V. The following directional terms "front," "rear," "forward,"

"rearward," "left," "right," "lateral," "longitudinal," "upward," and "downward," as well as any other similar directional terms, refer to those directions which are determined on the basis of a rider sitting upright on a seat of the human-powered vehicle V while facing the handlebar H of the human-powered vehicle V.

As seen in FIG. 1, the operating device 10 is mounted to the downwardly curved portions of the handlebar H. The operating device 10 is a right hand side operating device operated by the rider's right hand. Here, the human-powered vehicle V further comprises an additional operating device 12. As seen in FIG. 1, the additional operating device 12 is coupled to the handlebar H in an installed state. The additional operating device 12 is mounted to the downwardly curved portions of the handlebar H. The additional operating device 12 is a left hand side operating device operated by the rider's left hand.

In the first embodiment, the operating device 10 and the additional operating device 12 are configured to perform both a braking operation and a shifting operation. Thus, the operating device 10 and the additional operating device 12 are configured as a road brifter (i.e., an operating device having both a shifting function and a braking function).

Figure 2:
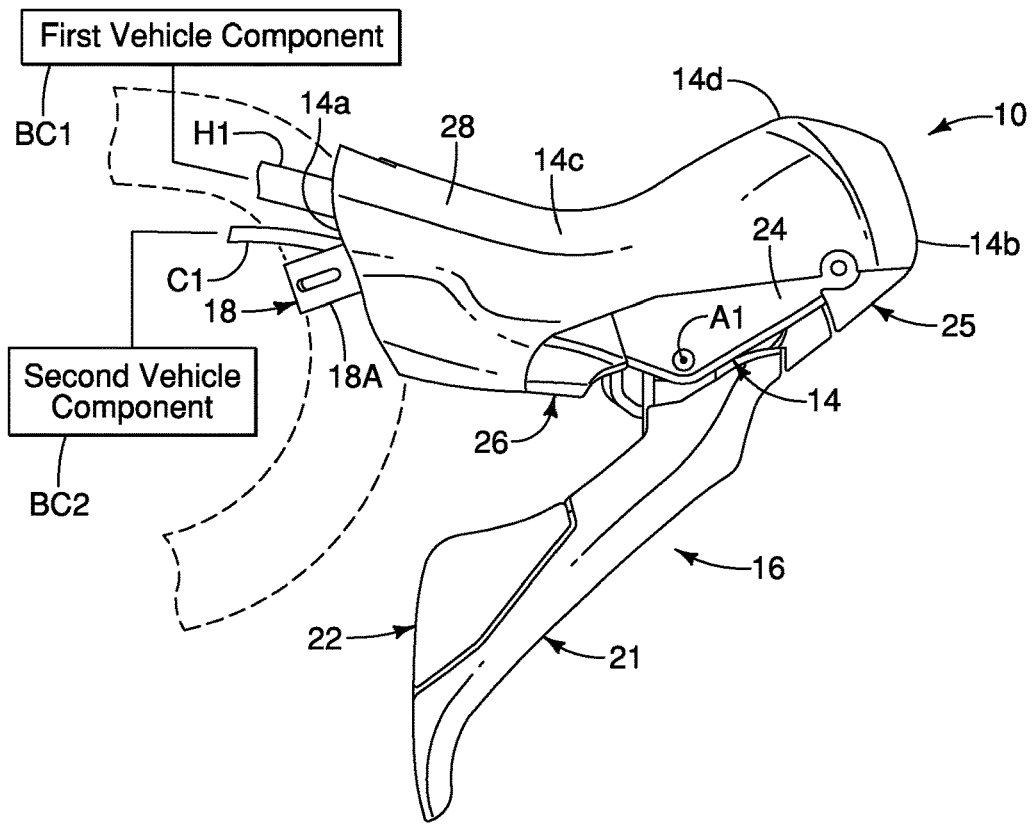
FIG. 2 is an outside elevational view of a right portion of the handlebar and one of the operating devices illustrated in FIG. 1 in which the operating member is in the rest position.
Figure 3:
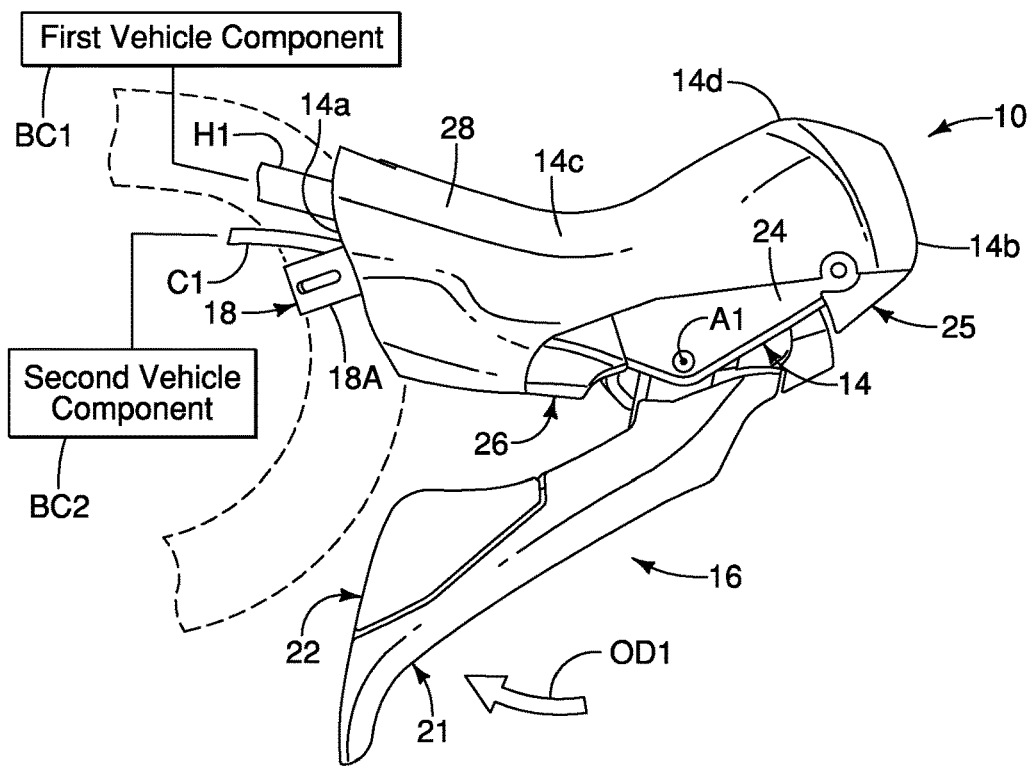
FIG. 3 is an outside elevational view of the operating device illustrated in FIG. 2 in which the operating member has been moved to an operated position for operating a brake device.
Figure 4:
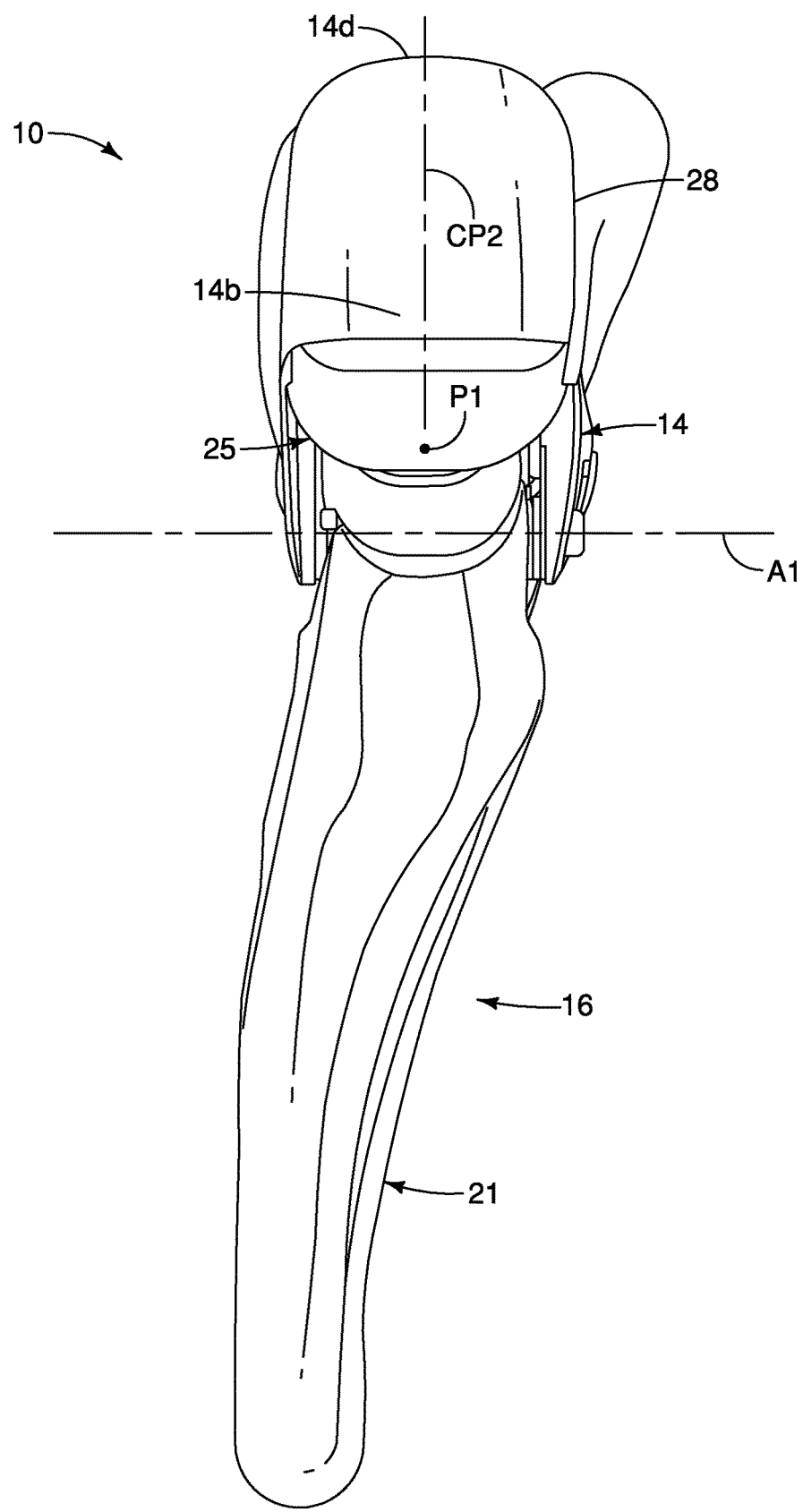
FIG. 4 is a front elevational view of the operating device illustrated in FIGS. 2 and 3 in which the operating member is in the rest position.

In the case of the human-powered vehicle V, as seen in FIGS. 2 and 3, the operating device 10 is operatively coupled to a first vehicle component BC1 (e.g., a rear hydraulic brake device) via a hydraulic hose H1 and operatively coupled to a second vehicle component BC2 (e.g., a rear transmission device) via a conventional control cable C1 (e.g., a Bowden cable). Similarly, the additional operating device 12 (FIG. 1) is operatively coupled to a third vehicle component (e.g., a front hydraulic brake device) via a hydraulic hose H2 (FIG. 1) and operatively coupled to a fourth vehicle component (e.g., a front transmission device) via a conventional control cable C2 (FIG. 1). The hydraulic hoses H1 and H2 and the control cables C1 and C2 (e.g., a Bowden cables) are conventional structures commonly used in the human-powered vehicle field. Each of the control cables C1 and C2 has an inner wire that is slidably disposed inside an outer casing. Rather, broadly speaking, the operating device 10 and the additional operating device 12 can be used for selectively operating other components of the human-powered vehicle V. The additional operating device 12 is a basically a mirror image of the operating device 10 except that the operating device 10 is configured to shift more gear stages than the additional operating device 12. Thus, the additional operating device 12 will not be discussed in further detail.

Referring now to FIGS. 2 to 5, the configuration of the operating device 10 will be discussed in further detail. Basically, as seen in FIGS. 2 to 5, the operating device 10 comprises a base 14 and an operating member 16. The base 14 is configured to be coupled to the human-powered vehicle V. In the first embodiment, the base 14 is configured to be coupled to the handlebar H. In particular, the operating device 10 further comprises a mounting part 18 that is mounted to the base 14 for coupling the base 14 to the handlebar H. In the first embodiment, the mounting part 18 is configured to be mounted to the right side of the handlebar H. Alternatively, the mounting part 18 is configured to be mounted to the left side of the handlebar H as needed and/or desired.

Referring to FIGS. 2 and 3, the operating device 10 is configured to be used for operating the first vehicle component BC1 and the second vehicle component BC2. However, the operating device 10 can be configured to be used with only the first vehicle component BC1. In the illustrated embodiment, as mentioned above, the first vehicle component BC1 is a hydraulically operated device such as a rear hydraulic brake device. Thus, in the illustrated embodiment, the operating member 16 is configured to operate a brake device while the operating member 16 in an operating position. In the illustrated embodiment, as mentioned above, the vehicle component BC2 is a cable operated device such as a rear cable operated transmission device. Thus, in the illustrated embodiment, the operating device 10 is configured to perform a braking operation and a shifting operation. In other words, in the illustrated embodiment, the first vehicle component BC1 is a brake device such as a hydraulic brake caliper, and the second vehicle component BC2 is transmission device such as a cable operated derailleur or internal gear hub.

Referring to FIGS. 2 to 7, the operating member 16 is configured to operate both the first vehicle components BC1 and the second vehicle component BC2. In particular, in the illustrated embodiment, the operating member 16 comprises a first operating lever 21 and a second operating lever 22. The first operating lever 21 is configured to operate both the first vehicle components BC1 and the second vehicle component BC2. Thus, in the illustrated embodiment, the first operating lever 21 constitutes both a brake lever and a shift lever. In the illustrated embodiment, the second operating lever 22 is configured to only operate the second vehicle component BC2. As explained below, the first operating lever 21 is configured to perform a pulling operation to pull an inner wire of the first control cable C1 with respect to the base 14, while the second operating lever 22 is configured to perform a releasing operation to release the inner wire of the first control cable C1 with respect to the base 14.

Depending on the construction of the operating device 10, as explained below, the second operating lever 22 can be omitted, and the first operating lever 21 can be used to perform both the pulling operation and the releasing operation. In any case, the operating member 16 is pivotally mounted to the base 14 about a first pivot axis A1. Here, the first operating lever 21 and the second operating lever 22 both pivot together about the first pivot axis A1 when performing a braking operation. Also, the first operating lever 21 and the second operating lever 22 are pivotally mounted as a unit on the base 14 to pivot about a shift pivot axis P1 for performing a shifting operation as discussed below. The construction and operation of the first operating lever 21 and the second operating lever 22 are disclosed in more detail in U.S. Pat. No. 9,056,597 (assigned to Shimano Inc.).

Figure 9:
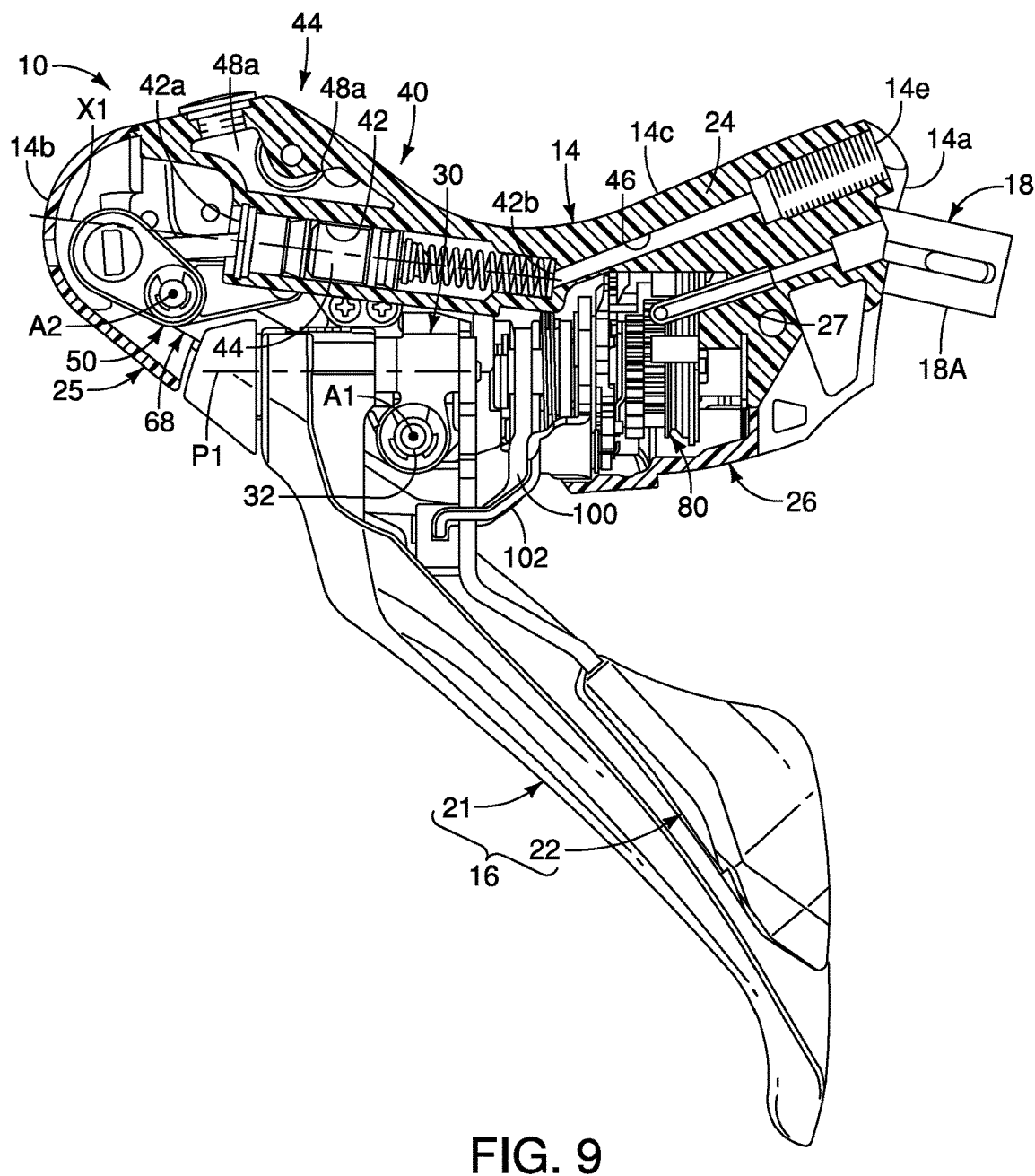
FIG. 9 is an inside elevational view of the operating device illustrated in FIGS. 2 to 8 in which the base is shown in cross-section as seen along section line 9-9 of FIG. 8 and in which the grip cover has been removed.

Referring to FIGS. 2, 3 and 9, the base 14 includes a first end 14a, a second end 14b, and a grip portion 14c. The first end 14a is configured to be coupled to the handlebar H. The second end 14b is opposite to the first end 14a. The grip portion 14c is provided between the first end 14a and the second end 14b portion. The first end 14a can be referred to as a coupling end or a proximal end of the base 14 in that the first end 14a is coupled to the handlebar H and proximal to the handlebar H. The second end 14b can be referred to as a free end or a distal end of the base 14 in that the second end 14b is cantilever relative to the handlebar H and distal to the handlebar H. The first end 14a is configured to be coupled to the handlebar H. In particular, the first end 14a is provided with the mounting part 18 for mounting to the handlebar H. The second end 14b is opposite to the first end 14a. The second end 14b can also be referred to as a distal end portion of the base 14.

As mentioned above, the first end 14a of the base 14 is attached to the bicycle handlebar H by the mounting part 18.

Figure 5:
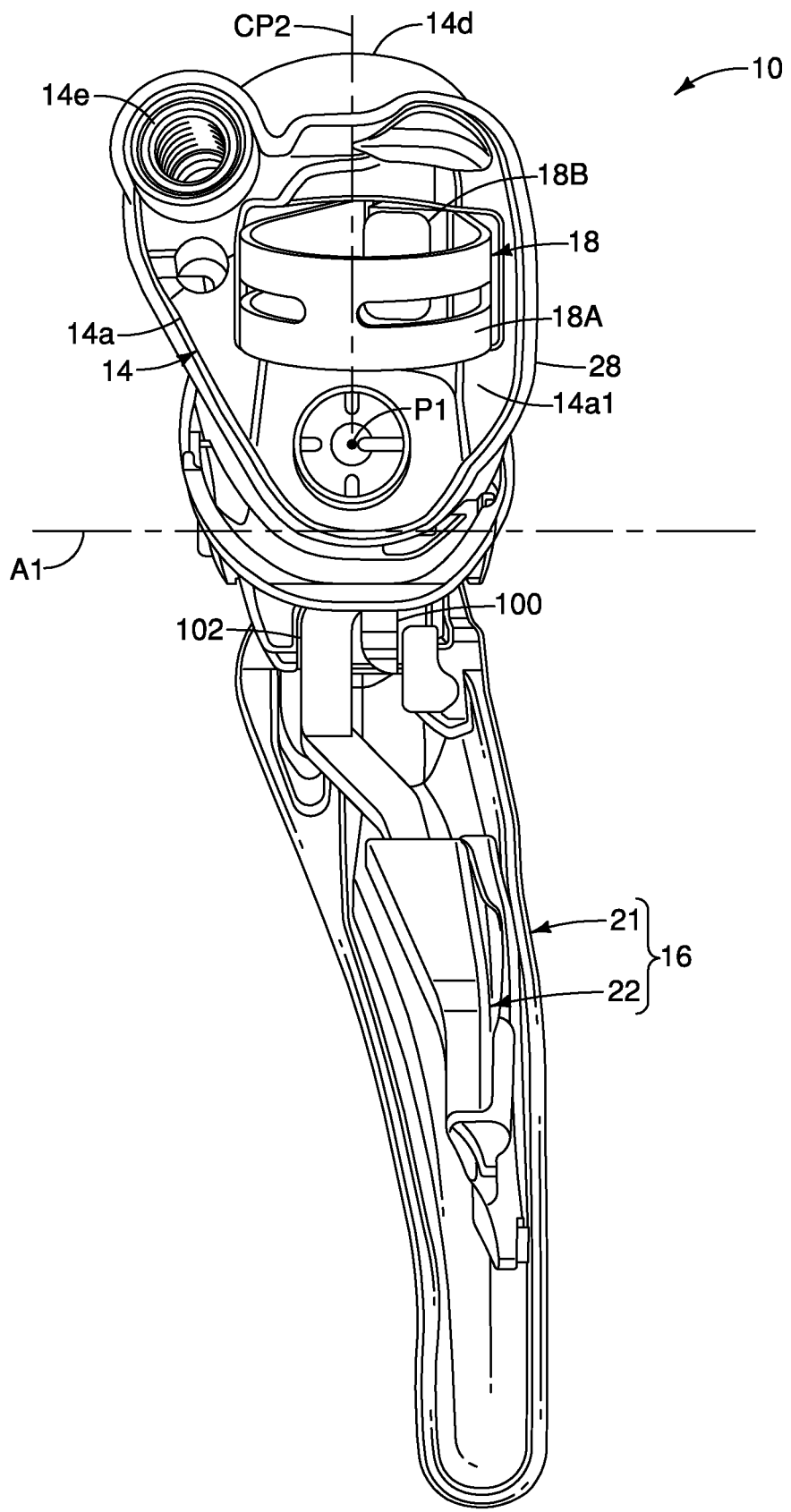
FIG. 5 is a rear elevational view of the operating device illustrated in FIGS. 2 to 4 in which the operating member is in the rest position.
Figure 8:
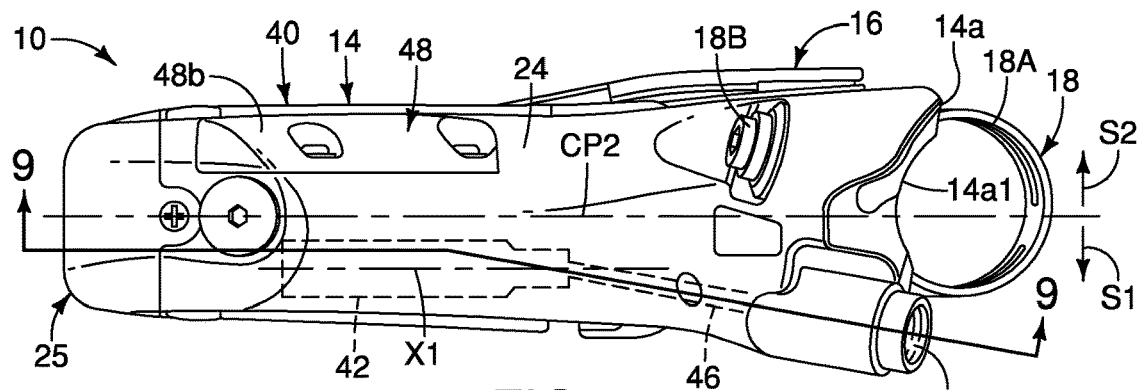
FIG. 8 is a top plan view of the operating device illustrated in FIGS. 2 to 7 in which the grip cover has been removed.

Here, the first end 14a of the base 14 has a handlebar receiving recess 14a1. The mounting part 18 is disposed in the handlebar receiving recess 14a1 of the first end 14a of the base 14. The base 14 is a stationary member when mounted to the handlebar H by the mounting part 18. Since the base 14 is fixed to the handlebar H by the mounting part 18, the base 14 constitutes a fixed member with respect to the handlebar H. The mounting part 18 is preferably a conventional band clamp or similar structure that is used in a road shifter for gripping the handlebar H. Here, as seen in FIGS. 5 and 8, the mounting part 18 includes a clamping band 18A and a fastener 18B (e.g., a nut and bolt) for gripping the handlebar H. Since the mounting part 18 can be any suitable mounting structure, the mounting part 18 will not be discussed or illustrated in further detail herein.

The base 14 further includes a pommel portion 14d at the second end 14b. In other words, the pommel portion 14d is part of the distal end portion of the base 14. The pommel portion 14d is an upwardly protruding portion that protrudes upwardly relative to the grip portion 14c in a state where the base 14 is mounted to the curved portion of the handlebar H. The pommel portion 14d is also configured for a rider to grip as needed and/or desired.

The grip portion 14c is provided between the first end 14a and the second end 14b. The grip portion 14c is sized for the rider to grip and lean on during riding. Thus, the rider grips the grip portion 14c between the first end 14a and the pommel portion 14d. The first end 14a, the second end 14b, the grip portion 14c and the pommel portion 14d can be a one-piece member or made of several pieces fastened together.

Also, as seen in FIGS. 5, 8 and 9, the base 14 further includes an outlet port 14c. The outlet port 14e is provided at the first end 14a of the base 14. The outlet port 14c is configured to couple the hydraulic hose H1 to the base 14 in a conventional manner. For example, in the illustrated embodiment, the outlet port 14e is partly threaded for attaching the hydraulic hose H1 to the base 14. The base 14 includes a first lateral side S1 and a second lateral side S2. The first lateral side S1 and the second lateral side S2 of the base 14 are defined by a center plane CP2, which basically bisects the base 14 by a vertical place that passes through a center of the clamping band 18A of the mounting part 18. Here, the outlet port is located on the first lateral side S1 of the base 14.

Preferably, the base 14 is made of a non-metallic material. More preferably, the base 14 is made of a resin material. For example, the base 14 is made of a hard-plastic material (resin), which can be reinforced with fibers as needed and/or desired. The resin of the base 14 is a rigid material that is suitable for a rider to grip and lean on during riding. The resin of the base 14 is also lightweight such that the overall weight of the operating device 10 can be minimized. However, the base 14 can be made of other suitable materials as needed and/or desired.

Figure 10:
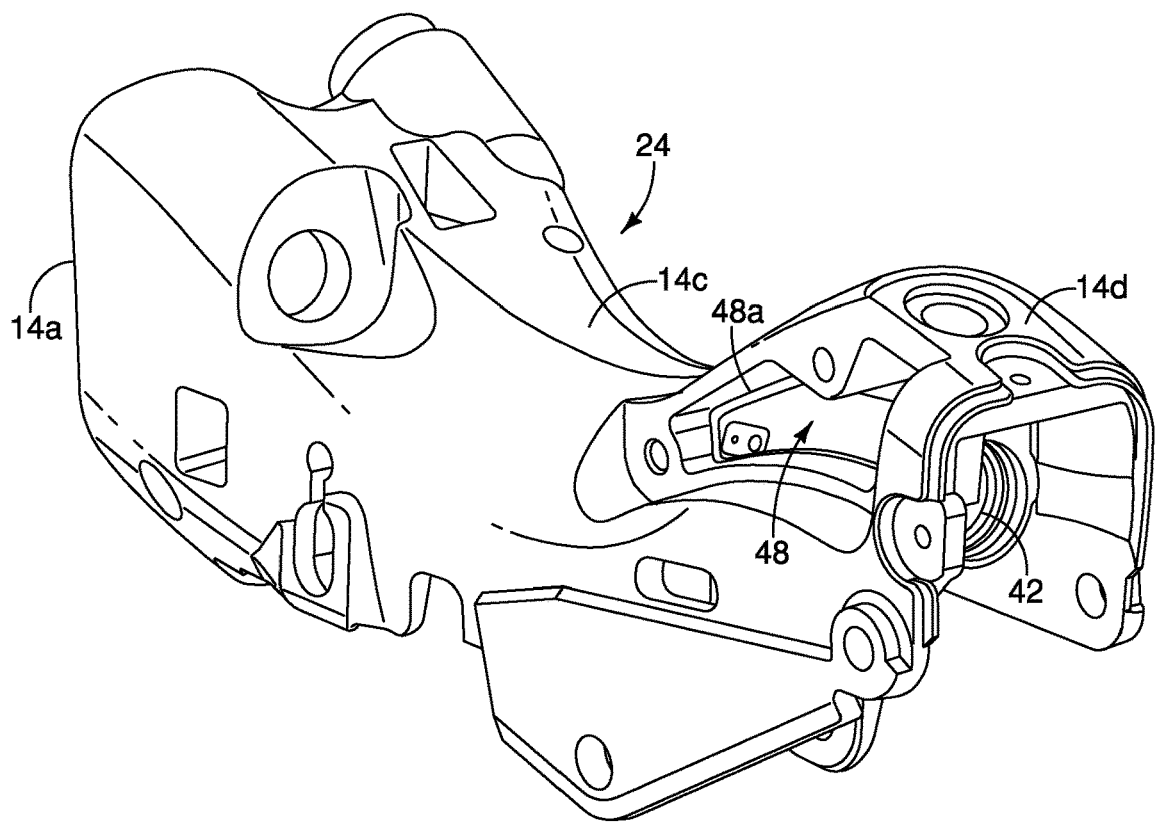
FIG. 10 is a first side perspective view of the base of the operating device illustrated in FIGS. 2 to 9.
Figure 11:
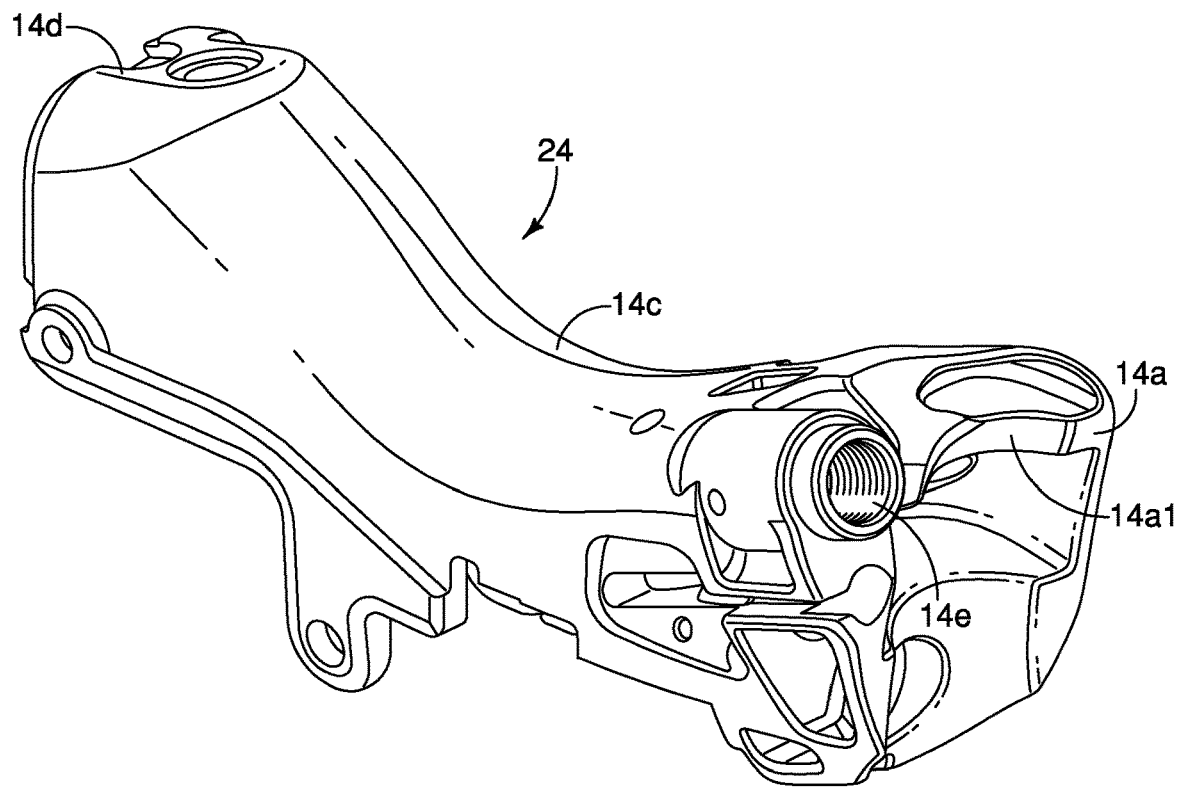
FIG. 11 is a second side perspective view of the base illustrated in FIG. 10 for the operating device illustrated in FIGS. 2 to 9.

As seen in FIG. 9, here, the base 14 includes a main body 24, a front cap 25 removably attached to the main body 24 and a bottom panel 26 removably attached to the main body 24. The main body 24, the front cap 25 and the bottom panel 26 are preferably each made of a non-metallic material such as a hard resin material. As seen in FIGS. 10 and 11, the main body 24 includes the first end 14a of the base 14, and forms a majority of the grip portion 14c and to form a portion of the pommel portion 14d. As seen in FIGS. 8 and 9, the front cap 25 is attached to the main body 24 to define the second end 14b of the base 14 and to form a portion of the pommel portion 14d. As seen in FIG. 9, the bottom panel 26 is attached to the main body 24 to form a portion of the grip portion 14c. The bottom panel 20 is detachable coupled to the base 14 for accessing an interior space of the base 14. Here, as seen in FIG. 9, the base 14 is provided with a cable guide member 27. The cable guide member 27 is provided in a recess of the base 14 for guiding the inner wire of the control cable C1 into an interior cavity of the base 14.

As mentioned above, riders sometimes grip the base 14 and lean on the base 14 during riding. In view of this situation, it is desirable to provide a comfortable feeling for the rider's hand while the rider is gripping the base 14. Thus, as seen in FIGS. 2 to 7, the base 14 is preferably covered with a grip cover 28 (also called a base cover). The grip cover 28 partially covers the base 14 as seen in FIGS. 2 and 3. Here, the grip cover 28 covers the grip portion 14c, and also partially covers the pommel portion 14d. Thus, the grip cover 28 provides a cushion to the grip portion 14c of the base 14, and also provides an attractive appearance for the base 14. In this situation, the grip cover 28 is made of an elastomeric material. For example, the grip cover 28 is made of a flexible rubber material. The grip cover 28 has a tubular configuration such that the grip cover 28 is stretched over the base 14. In particular, the grip cover 28 is stretched over the grip portion 14c of the base 14 and the pommel portion 14d of the base 14. In other words, the grip cover 28 is an elastic piece such as rubber that partially covers the outside surface of the base 14 in the areas of the grip portion 14c and the pommel portion 14d.

Referring to FIGS. 2 to 7, the basic operation of the first operating lever 21 will now be discussed. Here, as seen in FIG. 3, the first operating lever 21 is pivotally coupled to the base 14 to pivot about the first pivot axis A1. Basically, the operating member 16 is configured to operate a brake device while the operating member 16 in the operating position. The first operating lever 21 is configured to pivot between a rest position (FIG. 2) and a first operated position (FIG. 3) in a first operating direction OD1 about the first pivot axis A1. In the illustrated embodiment, a braking operation is performed by pivoting the first operating lever 21 from the rest position (FIG. 2) towards the first operated position (FIG. 3) about the first pivot axis A1. Thus, the first operating lever 21 is configured to operate a brake device (e.g., the first vehicle component BC1) while the first operating lever 21 is in the first operated position. In this way, the first operating lever 21 functions as a brake lever.

Figure 6:
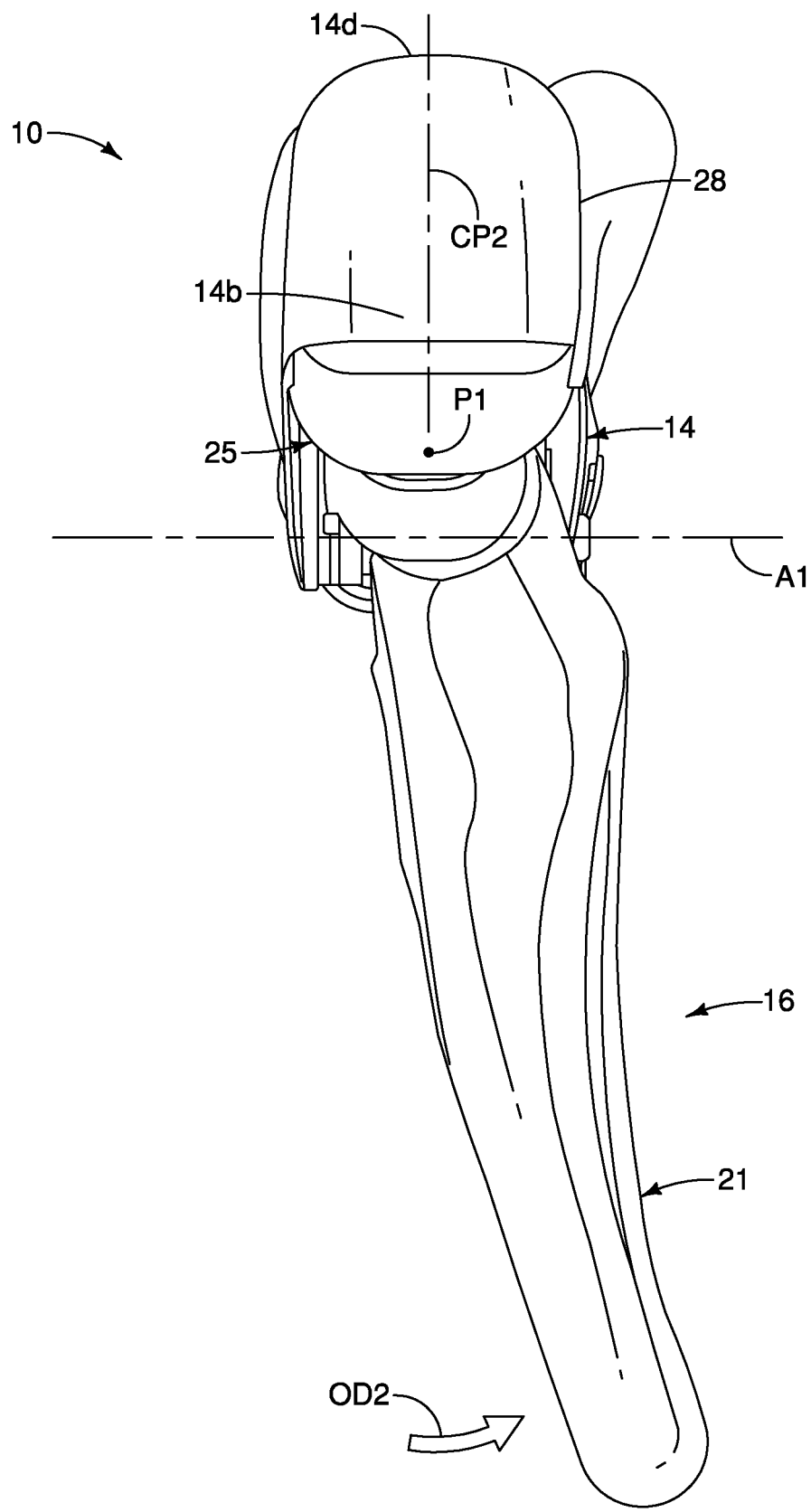
FIG. 6 is a front elevational view of the operating device illustrated in FIGS. 2 to 5 in which the operating member has been moved to a cable pulling position.

Also, as seen in FIG. 6, the first operating lever 21 is pivotally coupled to the base 14 about the shift pivot axis P1. The shift pivot axis P1 is different from the first pivot axis A1. More specifically, the shift pivot axis P1 extends perpendicularly to the first pivot axis A1 as viewed from above in a direction perpendicular to the first pivot axis A1 and the shift pivot axis P1. In the illustrated embodiment, a shifting operation is performed by pivoting the first operating lever 21 from the rest position (FIGS. 4 and 5) towards the second operated position (FIG. 6) about the shift pivot axis P1. Specifically, the rider pivots the first operating lever 21 about the shift pivot axis P1 in the second operating direction OD2 towards the vehicle center plane CP1 for performing a shifting operation. In other words, the first operating lever 21 pivots relative to the base 14 along a shifting plane that is transverse to a braking plane of the first operating lever 21 to perform a shifting operation. This pivotal movement of the first operating lever 21 from the rest position to the second operated position pulls the inner wire of the control cable C1. Thus, the first operating lever 21 functions as a cable pulling lever or a shift lever.

Figure 7:
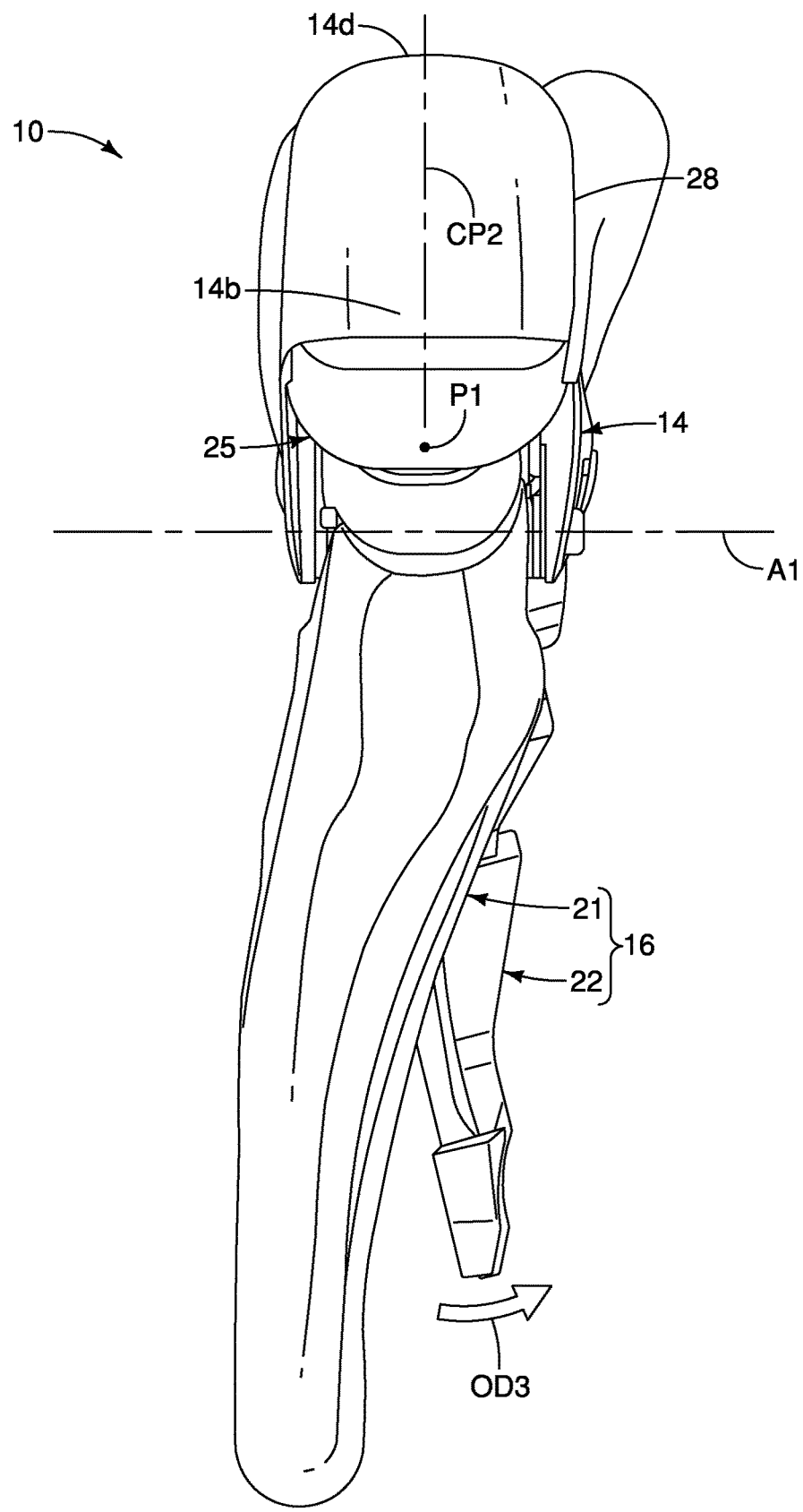
FIG. 7 is a front elevational view of the operating device illustrated in FIGS. 2 to 6 in which a second operating (shift release) lever of the operating member has been moved to a cable releasing position while the brake lever remains in the rest position.

Referring to FIGS. 5 and 7, the second operating lever 22 is pivotally coupled to the base 14. Here, in the illustrated embodiment, the second operating lever 22 is pivotally coupled to the first operating lever 21 as explained below. In particular, the second operating lever 22 pivots relative the first operating lever 21 about the shift pivot axis P1 in a third operation direction OD3 to move relative to the base 14 to perform a shifting operation. The third operating direction OD3 is basically parallel to the second operating direction OD2. The second operating lever 22 moves independently of the first operating lever 21 when the second operating lever 22 is directly moved by the rider about the shift pivot axis P1 in the third operating direction OD3. The second operating lever 22 is only configured to perform a shifting operation. Here, the second operating lever 22 constitutes as a cable releasing lever. In the illustrated embodiment, the second operating lever 22 is a trigger type lever that is biased to the rest position in a conventional manner as explained below. In other words, the second operating lever 22 automatically returns to the rest position upon the second operating lever 22 being released by the rider after the second operating lever 22 is operated about the shift pivot axis P1 in the third operating direction OD3 to perform the shifting operation. In this way, the second operating lever 22 functions as a shift lever.

Figure 12:
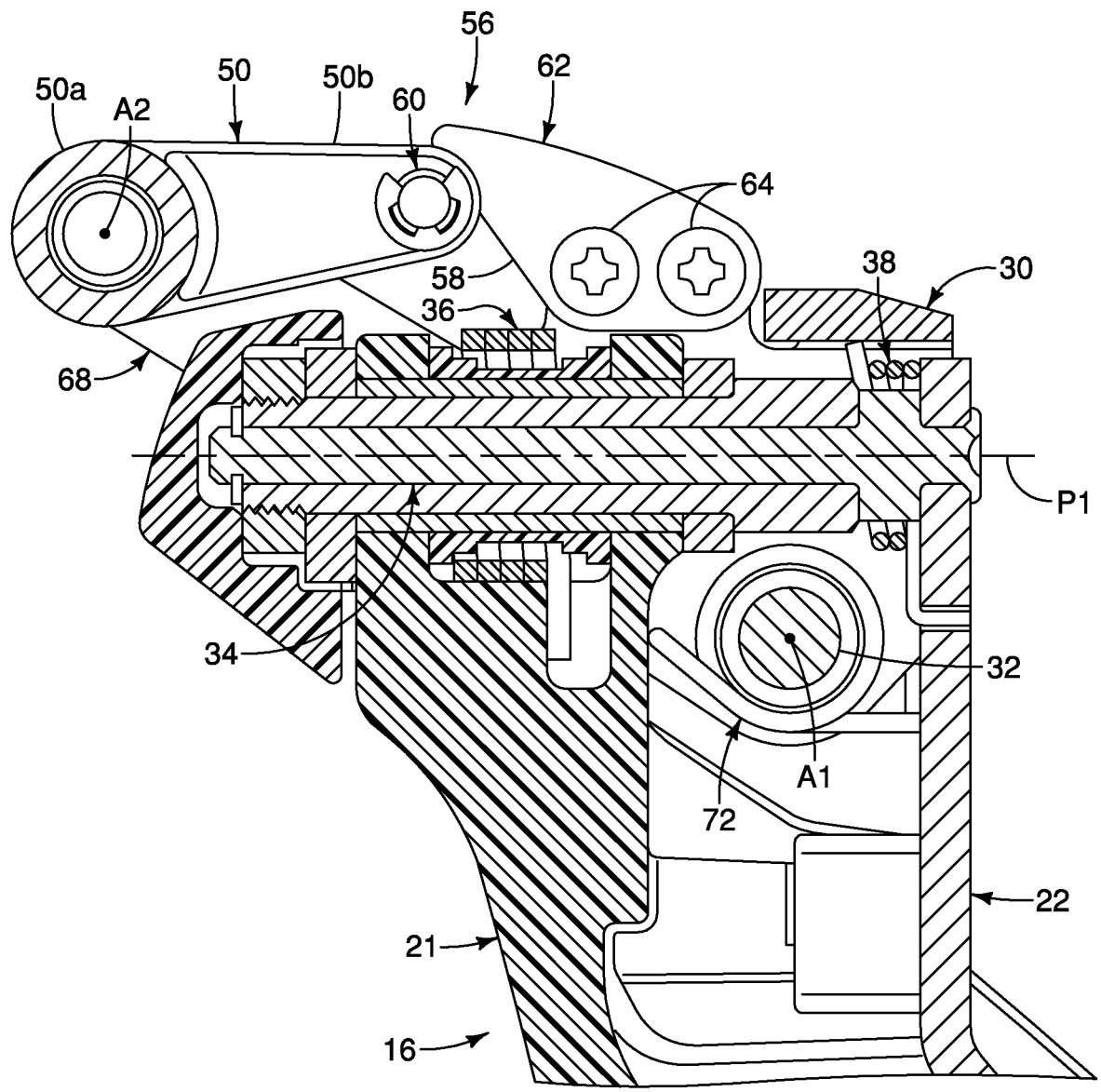
FIG. 12 is an enlarged partial cross-sectional view of a portion of the operating member as seen along section line 12-12 of FIG. 6 in which the base and the grip cover have been removed and the operating member is in the rest position.
Figure 13:
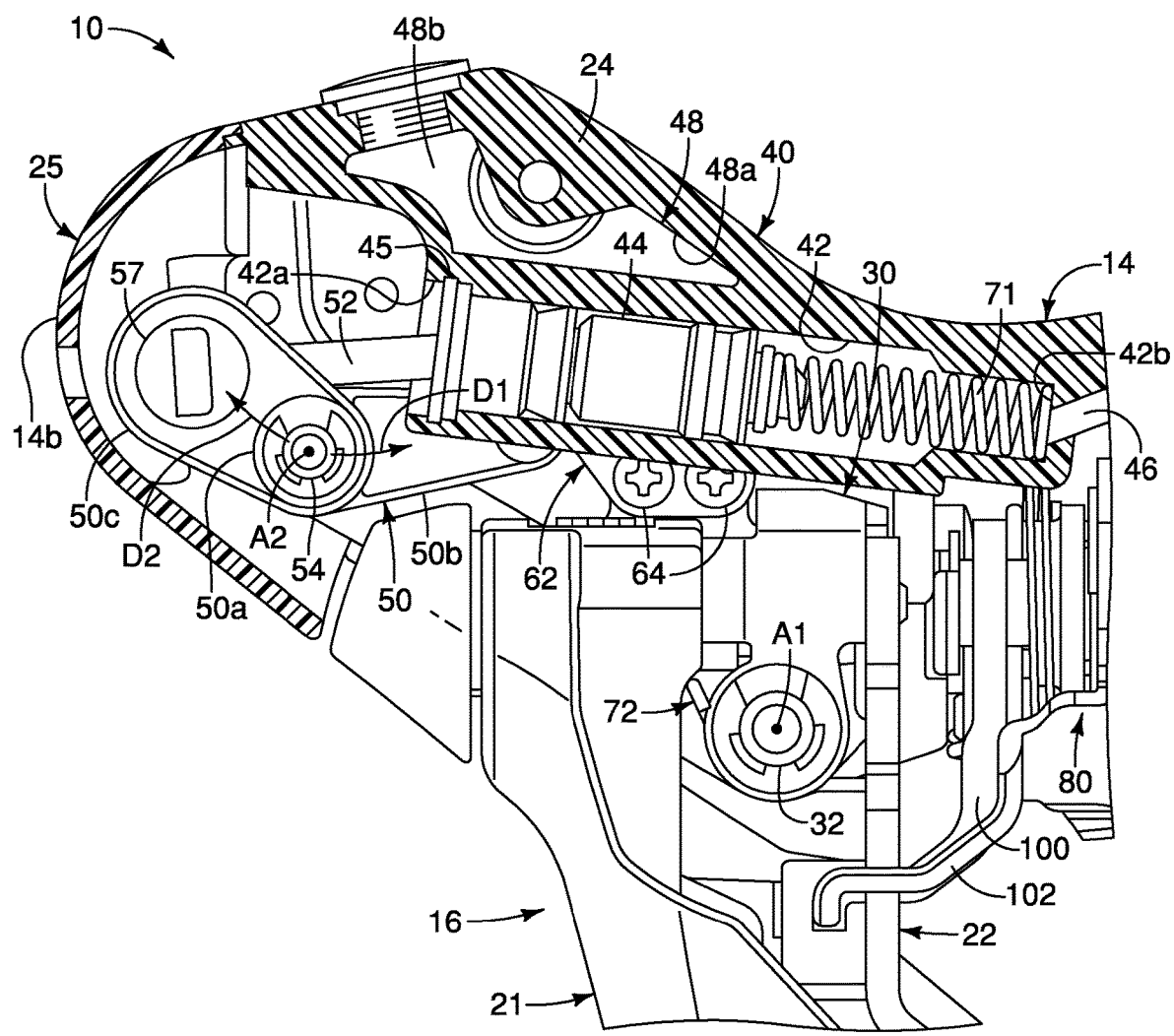
FIG. 13 is an enlarged partial inside elevational view of a portion of the operating device illustrated in FIGS. 2 to 9 in which the base is shown in cross-section and in which the grip cover has been removed.
Figure 14:
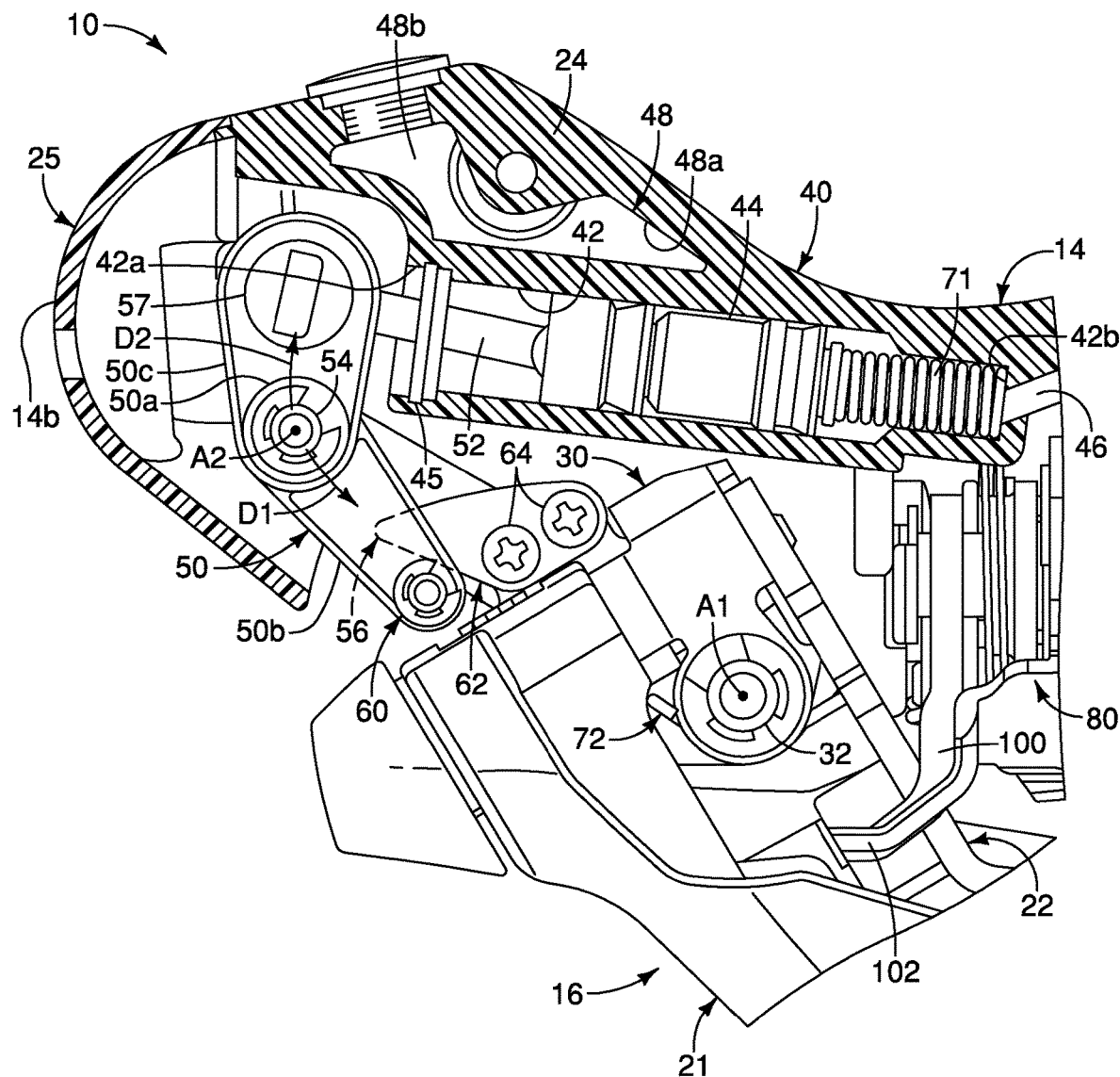
FIG. 14 is an enlarged partial inside elevational view of the portion of the operating device illustrated in FIG. 13 in which the operating member has been moved to an operated position for operating a human-powered vehicle component such as a brake device.
Figure 15:
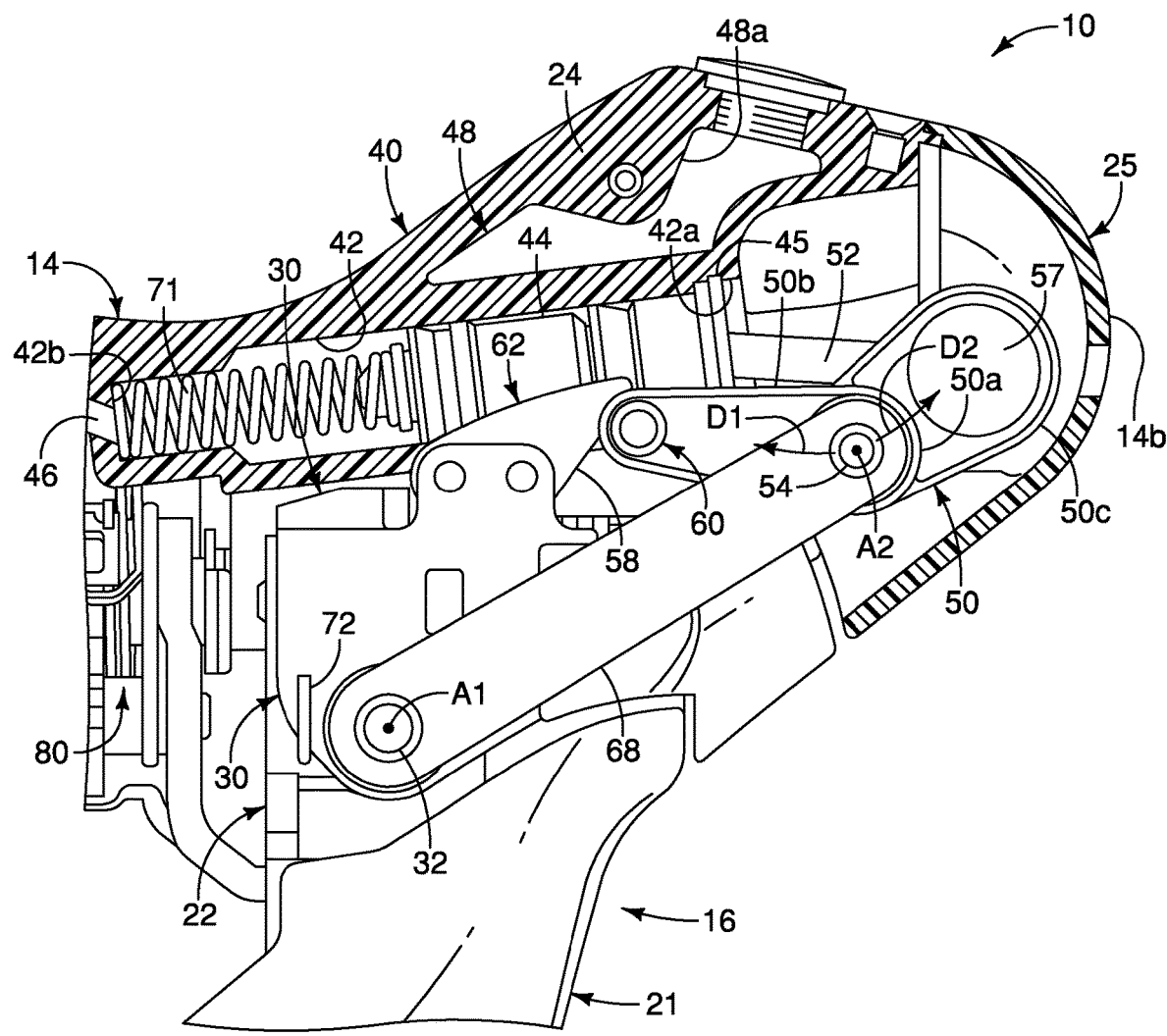
FIG. 15 is an enlarged partial outside elevational view of a portion of the operating device illustrated in FIGS. 2 to 9 in which the base is shown in cross-section and in which the grip cover has been removed.
Figure 16:
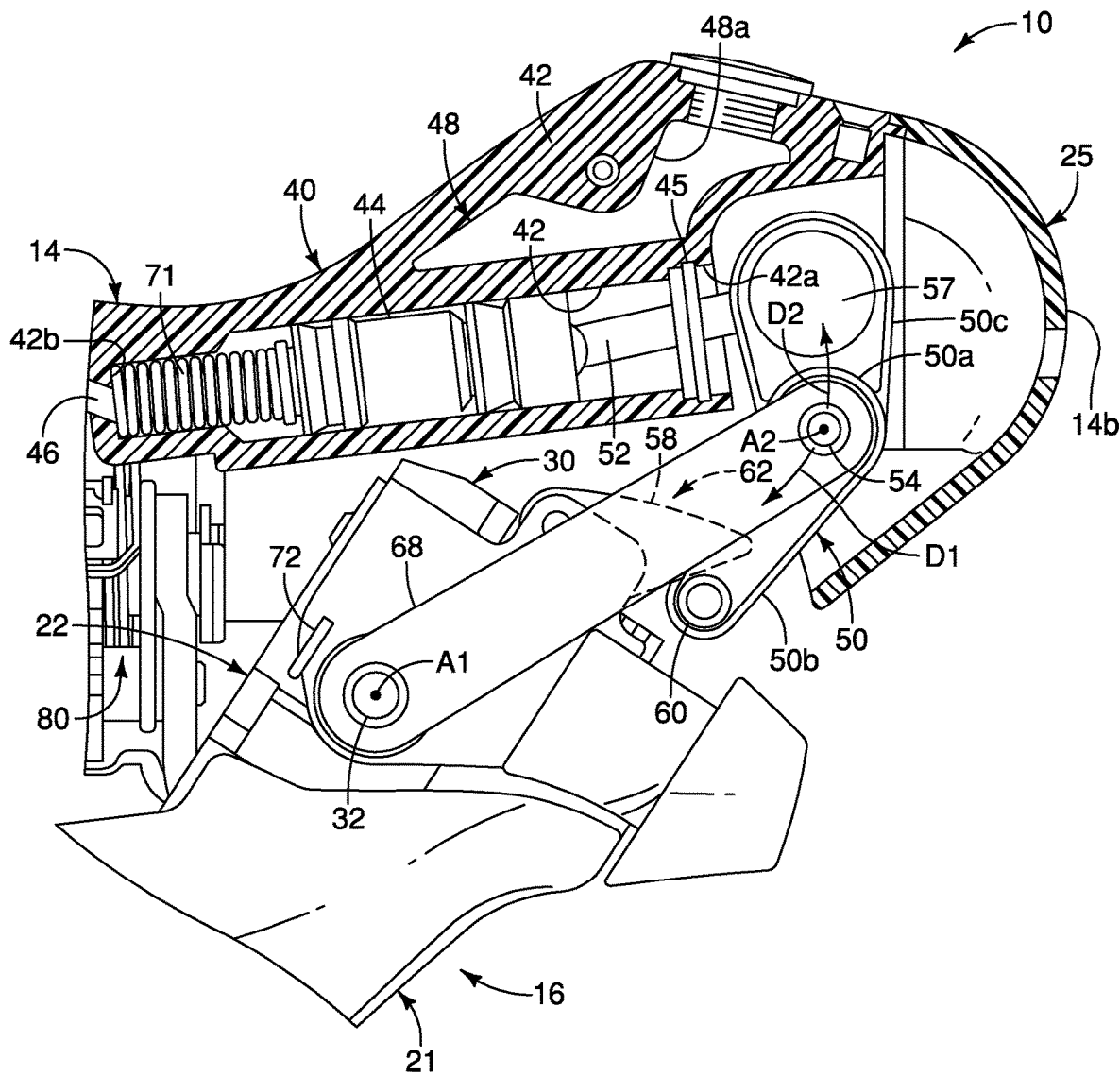
FIG. 16 is an enlarged partial outside elevational view of the portion of the operating device illustrated in FIG. 15 in which the operating member has been moved to an operated position for operating a human-powered vehicle component such as a brake device.

Referring to FIGS. 9 and 12, the operating device 10 further comprises an adapter 30 through which the operating member 16 is pivotally coupled to the base 14 about the first pivot axis A1. Here, the operating device 10 further comprises a first pivot axle 32. The first pivot axle 32 pivotally couples the adapter 30 to the base 14 for movement in the first operating direction OD1 as seen in FIG. 3. The first pivot axle 32 defines the first pivot axis A1. In this way, the first pivot axle 32 pivotally supports the operating member 16 to the base 14. In other words, the first operating lever 21 can pivot on the first pivot axle 32 to move relative to the base 14 to perform a braking operation.

The operating device 10 further comprises a shift pivot axle 34. The shift pivot axle 34 pivotally couples the operating member 16 to the adapter 30. The shift pivot axle 34 defines the shift pivot axis P1. In particular, the first operating lever 21 and the second operating lever 22 are both pivotally coupled to the mounting portion 30 via the shift pivot axle 34 to pivot about the shift pivot axis P1. In this way, the shift pivot axle 34 pivotally supports the operating member 16 to the base 14 via the adapter 30 for movement in the second operating direction OD2 as seen in FIG. 6. More specifically, both the first operating lever 21 and the second operating lever 22 are pivotally coupled to the shift pivot axle 34 to pivot about the shift pivot axis P1. In other words, the first operating lever 21 and the second operating lever 22 can pivot on the first pivot axle 32 to move relative to the base 14 to perform a shifting operation. On the other hand, the second operating lever 22 can pivot independently of the first operating lever 21. The second operating lever 22 can pivot on the first pivot axle 32 in a third operation direction OD3 to move relative to the base 14 to perform a shifting operation as mentioned above.

The first operating lever 21 is biased against the adapter 30 to establish the rest position of the first operating lever 21 with respect to the base 14 in the second operating direction OD2. In particular, as seen in FIG. 12, the operating device 10 further comprises a biasing member 36. The biasing member 36 is operatively disposed between the first operating lever 21 and the adapter 30. Here, the biasing member 36 is a torsion spring that is mounted on the shift pivot axle 34 as seen in FIG. 12. More specifically, the biasing member 36 has a coil portion mounted on the shift pivot axle 34. The biasing member 36 has a first leg extending from the coil portion and contacting the first operating lever 21. The biasing member 36 has a second leg extending from the coil portion and contacting the adapter 30. In this way, the first operating lever 21 is biased towards the rest position against the adapter 30. Thus, the first operating lever 21 is a trigger type lever that is biased towards the rest position when moved in the second operating direction OD2. In other words, the first operating lever 21 automatically returns to the rest position upon the first operating lever 21 being released by the rider after the first operating lever 21 is operated to perform the shifting operation.

The second operating lever 22 is also biased against the adapter 30 to establish the rest position of the second operating lever 22 with respect to the base 14 in the third operating direction OD3. In particular, the operating device 10 further comprises a biasing member 38. The biasing member 38 is operatively disposed between the second operating lever 22 and the adapter 30. Here, the biasing member 38 is a torsion spring that is mounted on the shift pivot axle 34 as seen in FIG. 12. More specifically, the biasing member 38 has a coil portion mounted on the shift pivot axle 34. The biasing member 38 has a first leg extending from the coil portion and contacting the second operating lever 22. The biasing member 38 has a second leg extending from the coil portion and contacting the adapter 30. In this way, the second operating lever 22 is biased towards the rest position when moved in the third operating direction OD3. Thus, the second operating lever 22 is a trigger type lever that is biased towards the rest position with respect to the base 14 in the third operating direction OD3. In other words, the second operating lever 22 automatically returns to the rest position upon the second operating lever 22 being released by the rider after the second operating lever 22 is operated to perform the shifting operation.

The term "rest position" as used herein refers to a state in which a movable part (e.g., the first operating lever 21 and/or the second operating lever 22) remains stationary without the need of a user or other external force intervening (e.g., holding the first operating lever 21 and/or the second operating lever 22) to establish a state corresponding to the rest position. Thus, the term "rest position" can also be referred to as a non-operated position or a neutral position. The terms "operated position" and "actuated position" as used herein refer to a position at which the movable part has been moved by the user from a rest position.

Referring now to FIGS. 9 and 13 to 16, the operating device 10 further comprises a hydraulic unit 40. Basically, the hydraulic unit 40 is provided to the base 14 and operated by the operating member 16. More specifically, the hydraulic unit 40 is operated by the operating lever 21 being pivoted about the first pivot axis A1 as illustrated in FIG. 3. Here, the hydraulic unit 40 is integrated into the base 14. In particular, the hydraulic unit 40 includes a cylinder bore 42. The cylinder bore 42 is integrally formed in the main body 24 of the base 14. In the illustrated embodiment, the cylinder bore 42 is at least partly closer to the second end 14*b* than the first pivot axis A1. Preferably, a majority of the cylinder bore 42 is disposed closer to the second end 14*b* than the first pivot axis A1. The cylinder bore 42 has a first cylinder end 42*a* and a second cylinder end 42*b*. The first cylinder end 42*a* is disposed closer to the second end 14*b* than the second cylinder end 42*b*.

Still referring to FIGS. 9 and 13 to 16, the hydraulic unit 40 further includes a piston 44. The piston 44 is movably provided in the cylinder bore 42. In the illustrated embodiment, the piston 44 is closer to the second end 14b where the piston 44 is at the initial position than where the piston 44 is at the actuated position. The piston 44 effectively closes off the first cylinder end 42a of the cylinder bore 42 so as to form a hydraulic chamber between the piston 44 and the second end 14b. The hydraulic fluid is disposed in the hydraulic chamber of the cylinder bore 42. The hydraulic fluid can be, for example, a mineral oil. A retaining clip 45 is disposed in the second cylinder end 42b for retaining the piston 44 in the cylinder bore 42. The retaining clip 45 can be, for example, a C-clip such as in the illustrated embodiment.

As seen in FIGS. 8 and 9, the base 14 further includes a hydraulic passageway 46 connecting the outlet port 14e to the cylinder bore 42. The hydraulic passageway 46 extends from the second cylinder end 42b of the cylinder bore 42 to the outlet port 14e to fluidly connect the hydraulic chamber of the cylinder bore 42 to the outlet port 14c. In this way, the hydraulic fluid can be pressurized in the hydraulic chamber of the cylinder bore 42 and supplied to the outlet port 14e via the hydraulic passageway 46 in response to movement of the first operating lever 21 from the rest position to the operated position about the first pivot axis A1 in the first operating direction OD1.

During movement of the piston 44 in response to operation of the first operating lever 21, hydraulic pressure is generated in the hydraulic chamber of the cylinder bore 42 through the movement of the piston 44. In particular, the piston 44 moves linearly within the cylinder bore 42 to force the hydraulic fluid out of the hydraulic chamber of the cylinder bore 42. The pressurized hydraulic fluid then travels from the hydraulic chamber of the cylinder bore 42 to the outlet port 14e via the hydraulic passageway 46. The pressurized hydraulic fluid is then supplied from the outlet port 14e to the first vehicle component BC1 via the first hydraulic hose H1. Thus, the hydraulic unit 40 is configured to supply pressurized hydraulic fluid to the first vehicle component BC1 in response to movement of the first operating lever 21 from the rest position to the operated position about the first pivot axis A1 in the first operating direction OD1.

As seen in FIG. 8, the cylinder bore 42 extends substantially parallel to the center plane CP2 of the operating device 10. Here, the cylinder bore 42 has a center longitudinal axis X1 that is offset from the center plane CP2 to the first lateral side S1, where the center plane CP2 bisects the first end 14a in a widthwise direction of the base 14 as viewed in a direction parallel to the center plane CP2. Also, in the illustrated embodiment, the cylinder bore 42 is entirely located on the first lateral side S1 of the center plane CP2 of the operating device 10 as seen in FIG. 8. Likewise, as seen in FIG. 8, the outlet port 14c and the hydraulic passageway 46 are located on the first lateral side S1.

In the first embodiment, the hydraulic unit 40 further comprises a hydraulic reservoir 48 that is connected to the cylinder bore 42 in a conventional manner. The hydraulic reservoir 48 is primarily located on the second lateral side S2 of the center plane CP2 of the operating device 10 as seen in FIG. 8. The hydraulic reservoir 48 is filled with a hydraulic fluid to supply the hydraulic fluid to the cylinder bore 42. The hydraulic reservoir 48 is disposed above the cylinder bore 42 where the operating device 10 is in the mounted state. Since hydraulic units are well known, the hydraulic unit 40 will not be discussed in further detail for the sake of brevity. The hydraulic reservoir 48 includes a reservoir tank 48a and a lid 48b. The reservoir tank 48a is integrally formed in the main body 24 of the base 14. The lid 48b is removably attached to the reservoir tank 48a.

As mentioned above and as seen in FIGS. 13 to 16, the piston 44 moves linearly inside the cylinder bore 42 in response to a braking operation of the first operating lever 21. Thus, the first operating lever 21 is operatively coupled to the piston 44 to move the piston 44 within the cylinder bore 42. In particular, the operating device 10 further comprises an intermediate member 50. The intermediate member 50 is movably coupled to the operating member 16 to move the piston 44 relative to the base 14 from an initial position to an actuated position in response to a movement of the operating member 16 from the rest position to the operating position. More specifically, the operating device 10 further comprises a push rod 52. The push rod 52 is interposed between the piston 44 and the intermediate member 50. In this way, the movement of the intermediate member 50 by the first operating lever 21 is transmitted to the intermediate member 50 which in turn moves the push rod 52, which pushes the piston 44. Thus, the intermediate member 50 and the push rod 52 operatively couples the first operating lever 21 to the piston 44. In other words, the first operating lever 21 is connected to the piston 44 by the intermediate member 50 and the push rod 52.

Referring now primarily to FIGS. 13 to 16, the intermediate member 50 will be discussed in further detail. Here, the intermediate member 50 is pivotally mounted to the base 14 about a second pivot axis A2. In particular, the operating device 10 further comprises a second pivot axle 54. The second pivot axle 54 pivotally supports the intermediate member 50 to the base 14. The second pivot axis A2 is defined by the second pivot axle 54. The second pivot axis A2 is parallel to the first pivot axis A1. Thus, the second pivot axle 54 is parallel to the first pivot axle 32. Also, the second pivot axis A2 is closer to the second end 14b than the first pivot axis A1. Thus, the second pivot axle 54 is closer to the second end 14b of the base 14 than the first pivot axle 32. In this way, the intermediate member 50 is at least partly closer to the second end 14b than the first pivot axis A1.

Basically, as seen in FIGS. 20 to 24, the intermediate member 50 includes a pivot portion 50a, a first arm portion 50b and a second arm portion 50c. The pivot portion 50a is pivotally mounted to the base 14. In particular, the pivot portion 50a is pivotally mounted to the base 14 by the second pivot axle 54. The first arm portion 50b extends from the pivot portion 50a in a first direction D1. The second arm portion 50c extends from the pivot portion 50a in a second direction D2 that is different from the first direction D1 as viewed in a direction parallel to the first pivot axis A1. More specifically, the first arm portion 50b extends towards the first end 14a where the piston 44 is at the initial position, and the second arm portion 50c extends towards the second end 14b where the piston 44 is at the initial position.

The first arm portion 50b is operatively coupled to the operating member 16. In particular, the first arm portion 50b is operatively coupled to the operating member 16 by a cam structure 56. In other words, movement of the operating member 16 is transmitted to the first arm portion 50b of the intermediate member 50 by the cam structure 56, which is discussed below. On the other hand, the second arm portion 50c is operatively coupled to the piston 44. In particular, the second arm portion 50c is operatively coupled to the piston 44 by the push rod 52. More specifically, the push rod 52 is provided with a trunnion pin 57 that is pivotally coupled to the second arm portion 50c of the intermediate member 50. The other end of the push rod 52 has a spherical part that contacts the piston 44. As explained later, a biasing force is applied to the intermediate member 50 to press the spherical part of the push rod 52 against the piston 44.

Here, the cam structure 56 basically includes a cam surface 58 and a follower 60. In the illustrated embodiment, the operating member 16 includes the cam surface 58, and the intermediate member 50 includes the follower 60. More specifically, a cam member 62 is provided with the cam surface 58. The cam member 62 is plate that is mounted to the adapter 30. For example, the cam member 62 is mounted to the adapter 30 by a pair of screws 64. The cam surface 58 is provided by an edge of the cam member 62. In the illustrated embodiment, the follower 60 includes a cam roller 66. The cam roller 66 rolls along the cam surface 58 as the first operating lever 21 is pivoted on the first pivot axle 32. In particular, the follower 60 is configured to contact the cam surface 58 such that the movement of the operating member 16 from the rest position to the operating position cause the intermediate member 50 to move the piston 44 from the initial position to the actuated position with a variable lever stroke to piston stroke ratio. In this way, as the first operating lever 21 is pivoted about the first pivot axis A1, a little movement of the first operating lever 21 causes a brake pad or pads of the first vehicle component (i.e., the brake device) to quickly move into contact with a brake rotor of the human-powered vehicle V. Also, the power multiplication factor then increases rapidly at the pad to rotor contact so more of the lever stroke is used to apply greater braking power with improved braking control.

As seen in FIGS. 13 to 16, the operating device 10 further comprises a brace 68. The brace 68 is coupled to the first pivot axle 32 and the second pivot axle 54. Thus, the brace 68 is stationary with respect to the base 14. Here, the brace 68 is made of a metallic material. In this way, the brace 68 provides stiffness and strength to the base 14.

Still referring to FIGS. 13 to 16, the operating device 10 further comprises a first biasing element 71. The first biasing element 71 is configured to bias the piston 44 towards the initial position. Specifically, the first biasing element 71 is disposed in the cylinder bore 42, and biases the piston 44 towards the initial position (i.e., the non-actuated or non-operated position). Here, the first biasing element 71 includes a coil compression spring that is disposed between the piston 44 and the base 14 (i.e., the second end 42b of the cylinder bore 42). The first biasing element 71 also biases the first operating lever 21 to its rest position or non-operated position about the first pivot axis A1 in a direction opposite to the first operating direction OD1. Thus, the first operating lever 21 automatically returns to the rest position upon the first operating lever 21 being released by the rider after the first operating lever 21 is operated to perform the braking operation. On the other hand, the piston 44 compresses the first biasing element 71 as the piston 44 moves in the cylinder bore 42 in response to an operation of the first operating lever 21 about the first pivot axis A1 in the first operating direction OD1.

Figure 17:
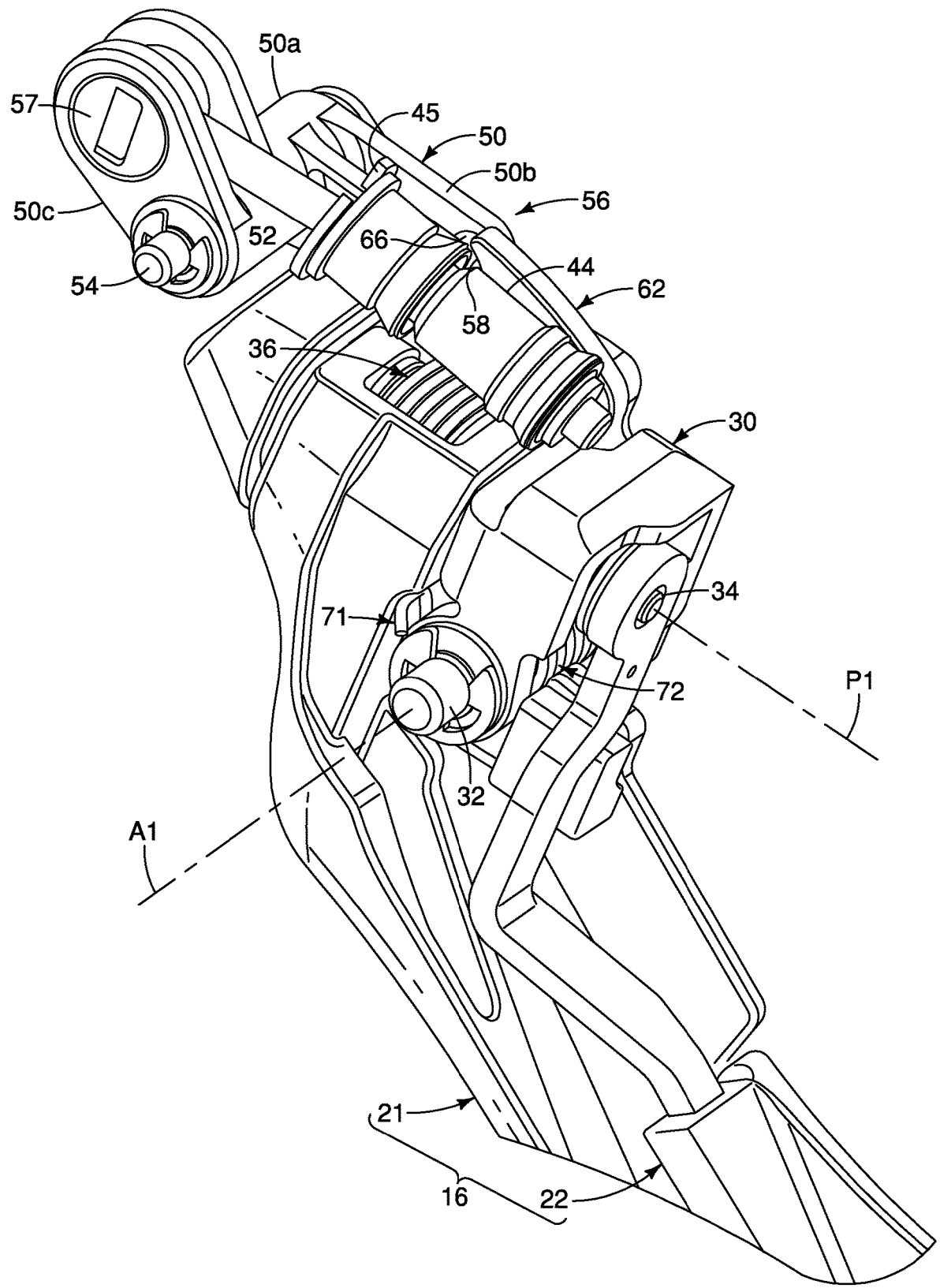
FIG. 17 is an enlarged partial perspective view of a portion of the operating member and the piston unit of the operating device illustrated in FIGS. 2 to 9 in which the operating member and the piston unit are in their rest positions.
Figure 18:
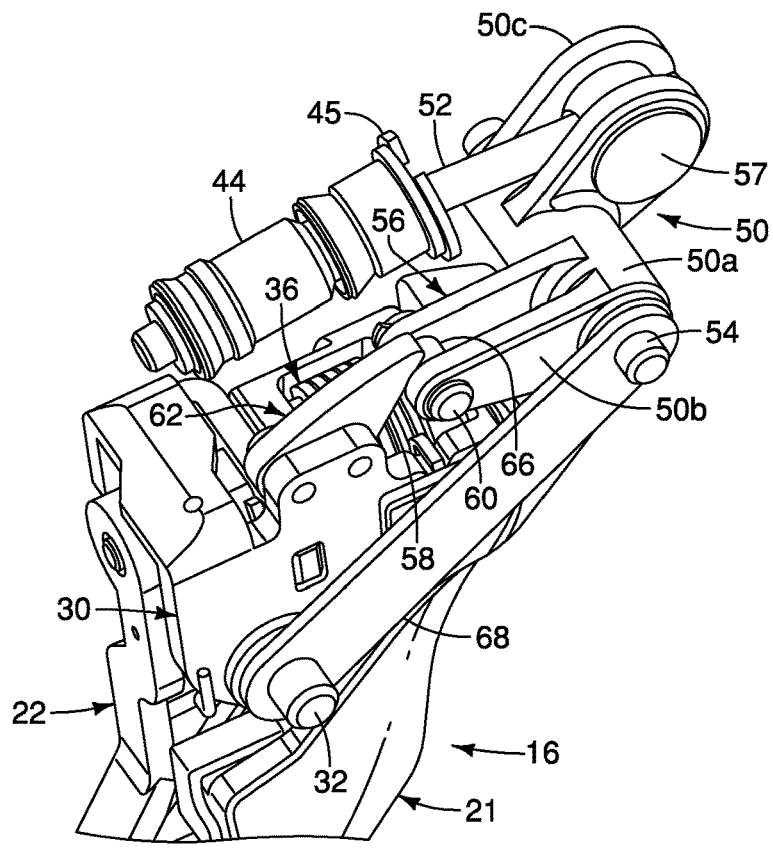
FIG. 18 is another enlarged partial perspective view of the portion of the operating member and the piston unit illustrated in FIG. 17 in which the operating member and the piston unit are in their rest positions.
Figure 19:
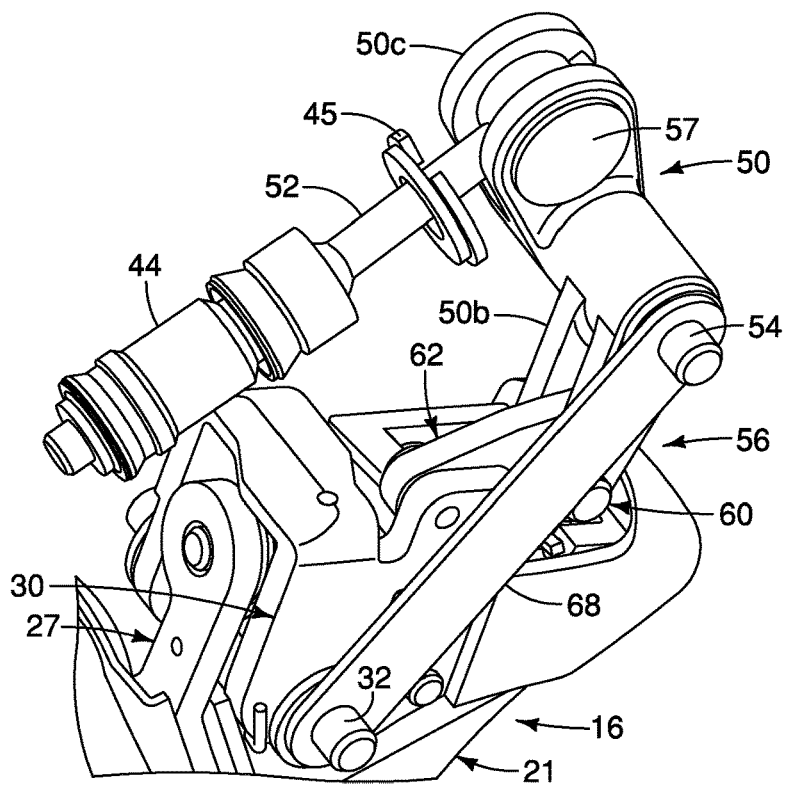
FIG. 19 is an enlarged partial perspective view of the portion of the operating member illustrated in FIG. 18 in which the operating member has been moved to an operated position for moving the piston unit to perform a braking operation in the case where the human-powered vehicle component a brake device.
Figure 20:
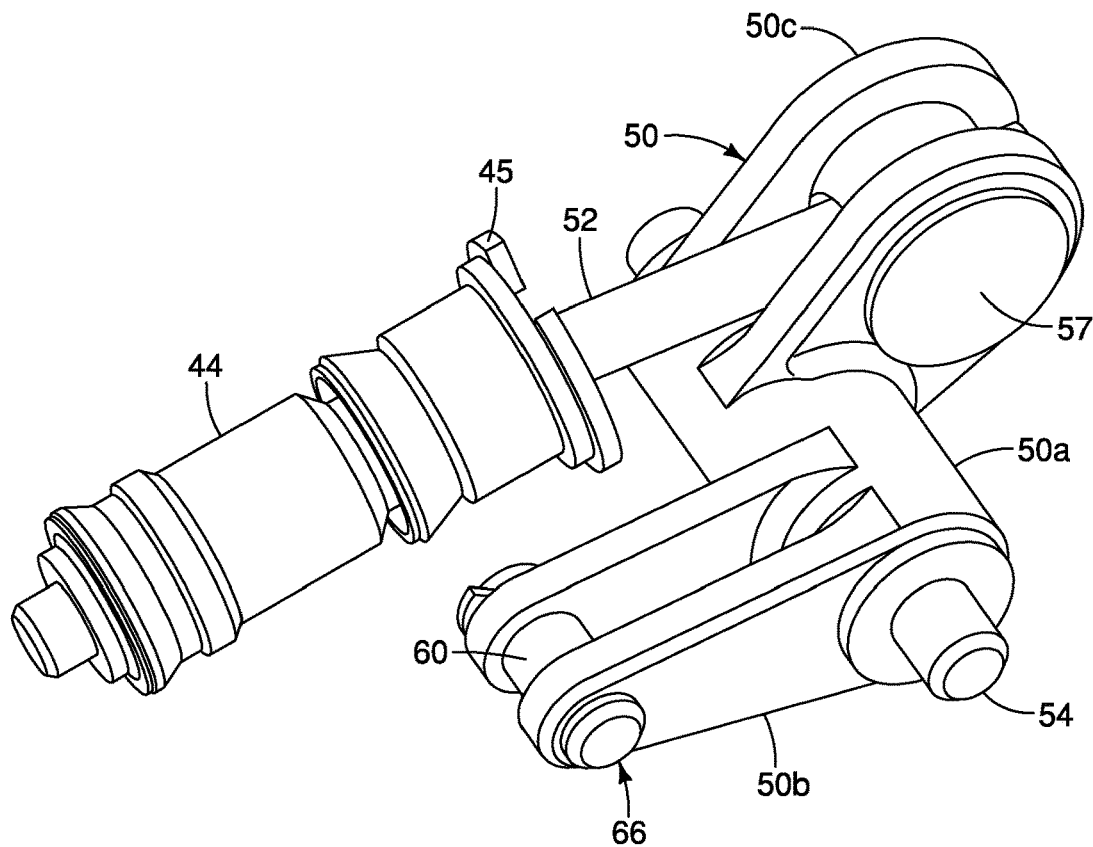
FIG. 20 is an enlarged partial perspective view of the linkage and the piston unit of the operating device illustrated in FIGS. 2 to 9 in which the linkage and the piston unit are in their rest positions.
Figure 21:
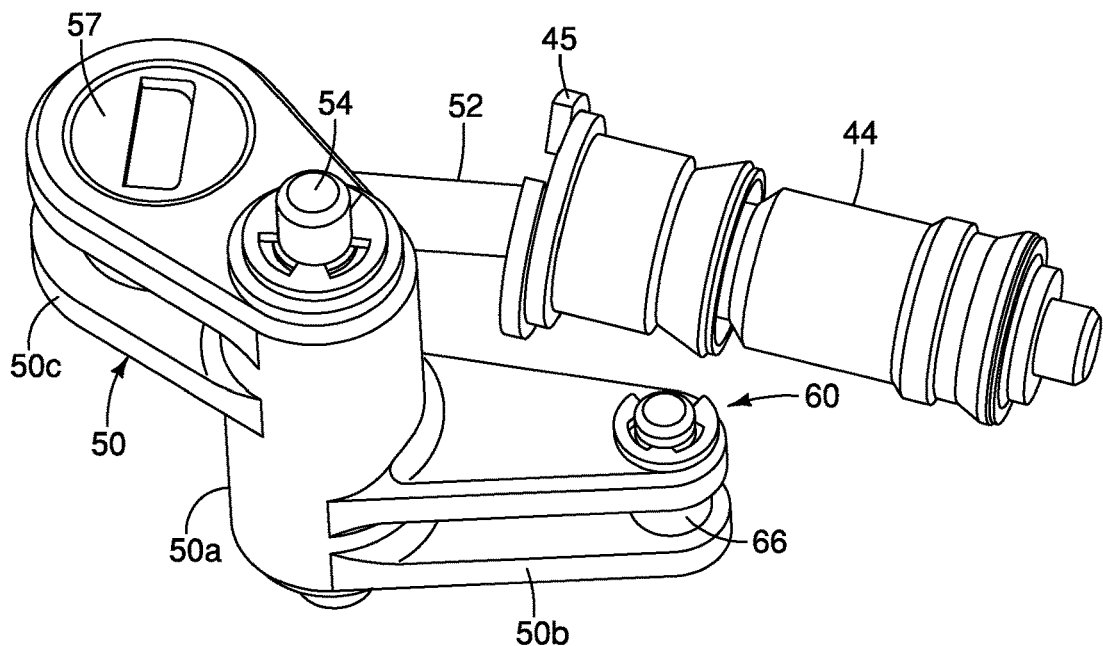
FIG. 21 is another enlarged partial perspective view of the linkage and the piston unit illustrated in FIG. 20 in which the linkage and the piston unit are in their rest positions.
Figure 22:
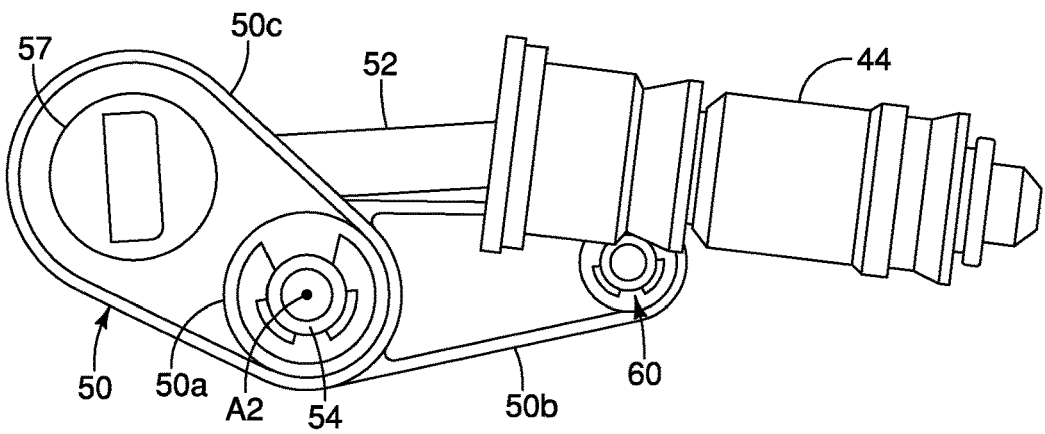
FIG. 22 is a first side elevational view of the linkage and the piston unit illustrated in FIGS. 20 and 21 in which the linkage and the piston unit are in their rest positions.
Figure 23:
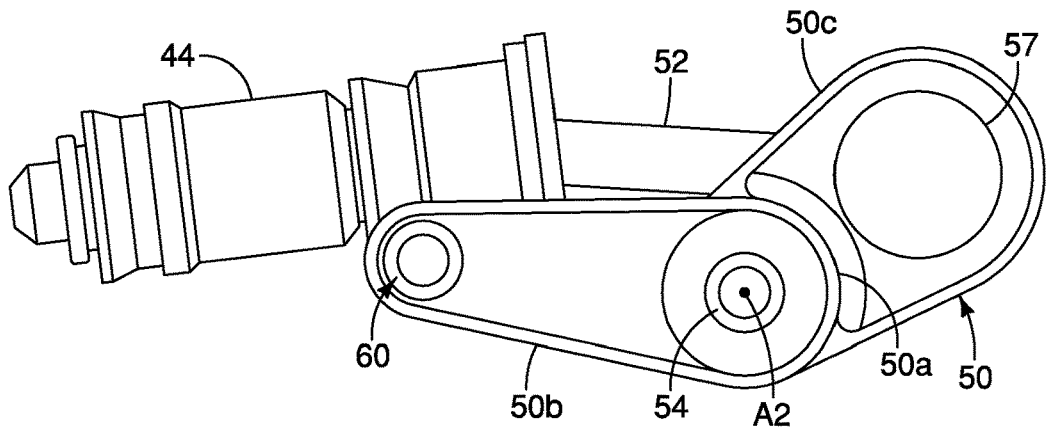
FIG. 23 is a second side elevational view of the linkage and the piston unit illustrated in FIGS. 20 to 22 in which the linkage and the piston unit are in their rest positions.
Figure 24:
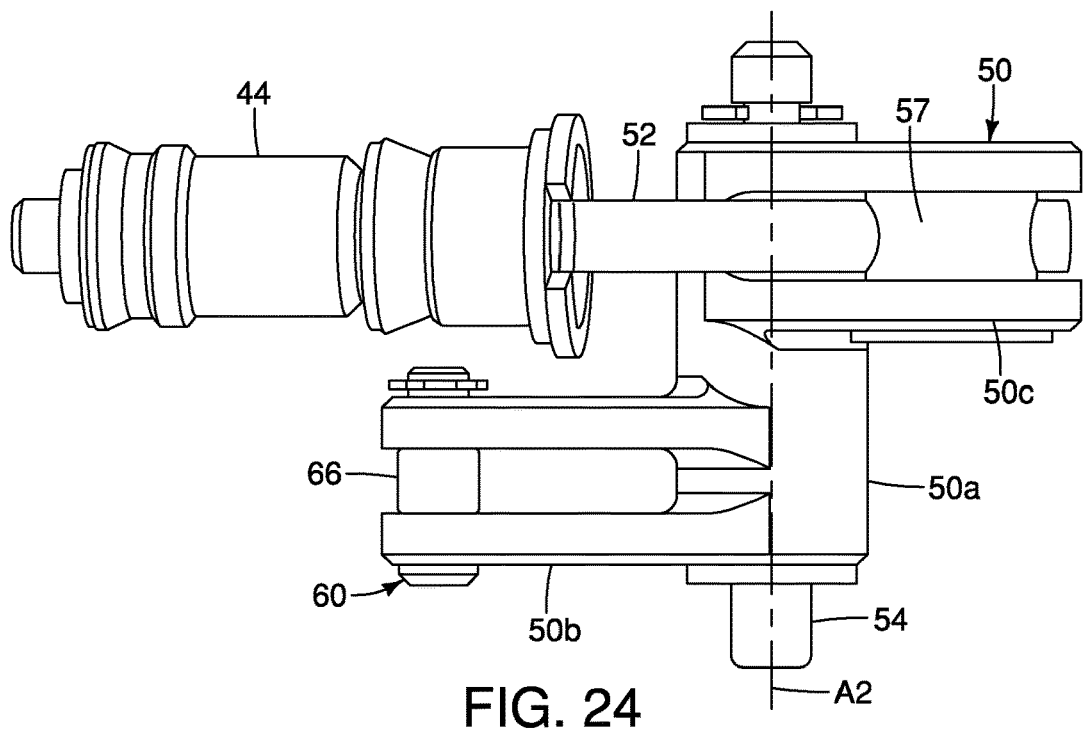
FIG. 24 is a second side elevational view of the linkage and the piston unit illustrated in FIGS. 20 to 23 in which the linkage and the piston unit are in their rest positions.

As seen in FIGS. 12 and 17, the operating device 10 further comprises a second biasing element 72. The second biasing element 72 is configured to bias the operating member 16 towards the operating position. In other words, the second biasing element 72 biases the first operating lever 21 about the first pivot axis A1 in the first operating direction OD1 towards the operating position. In this way, the second biasing element 72 applies biasing force to the intermediate member 50 via the cam structure 56 such that the cam surface 58 is biased into firm contact with the follower 60, and the spherical part of the push rod 52 is biased into firm contact with the piston 44.

However, the second biasing element 72 has a lower biasing force than the first biasing element 71. In this way, the first biasing element 71 biases the first operating lever 21 about the first pivot axis A1 to maintain the first operating lever 21 in the rest position with respect to the base 14. Here, the second biasing element 72 includes a torsion spring in which the coiled portion is disposed on the first pivot axle 32. A first leg portion of the second biasing element 72 extends from the coiled portion and contacts the first operating lever 21 and a second leg portion of the second biasing element 72 extends from the coiled portion and contacts the adapter 30. In the way, a biasing force is applied between the first operating lever 21 and the adapter 30 to bias the first operating lever 21 relative to the adapter 30 in the first operating direction OD1. Again, as mentioned above, the first operating lever 21 is maintained in the rest position by the first biasing element 71 because the biasing force of the second biasing element 72 is lower than the biasing force of the first biasing element 71.

Figure 25:
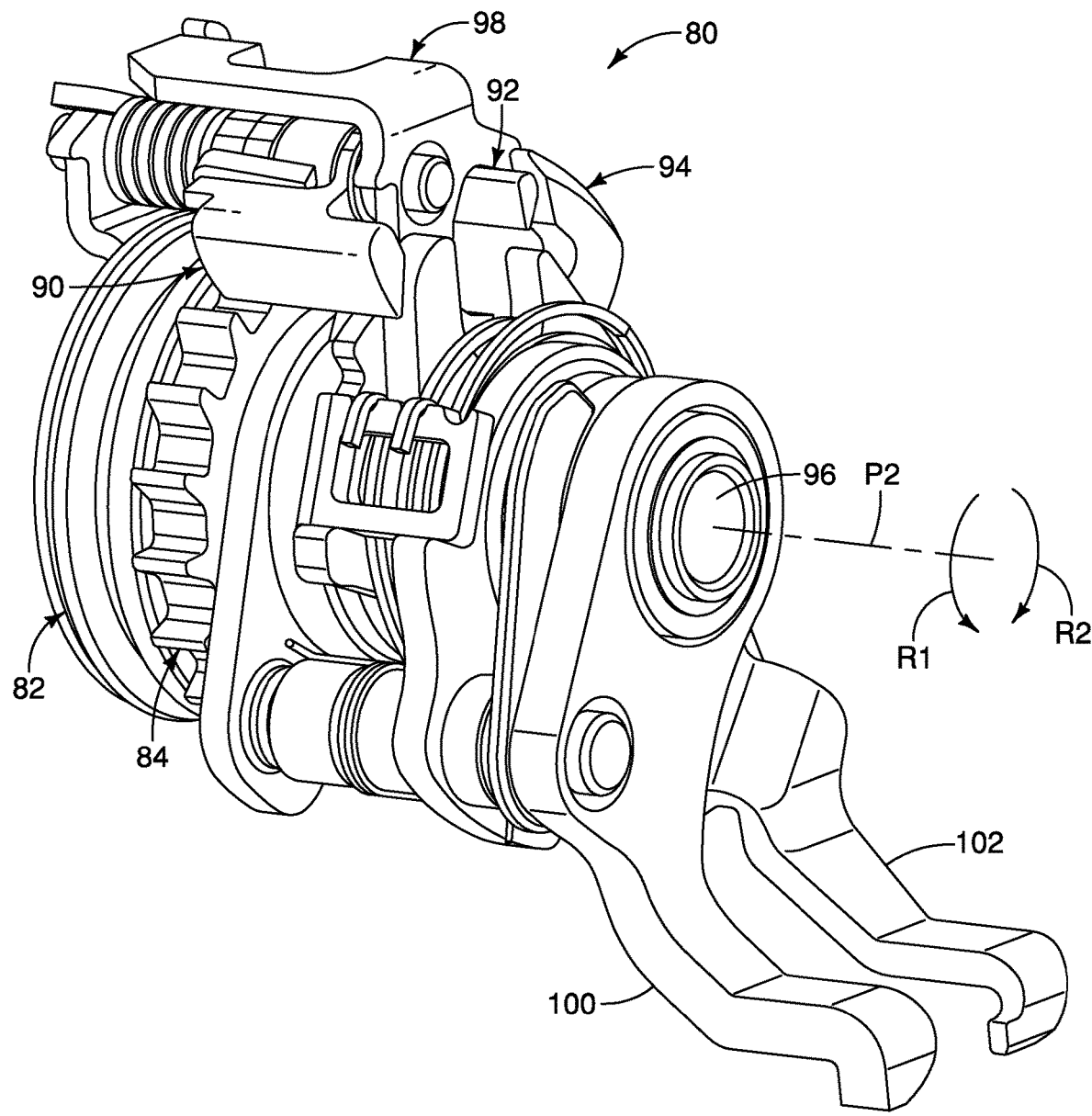
FIG. 25 is a perspective view of a shift unit (e.g., a component position maintaining mechanism) of the operating device illustrated in FIGS. 2 to 9 with the parts in their rest positions.
Figure 26:
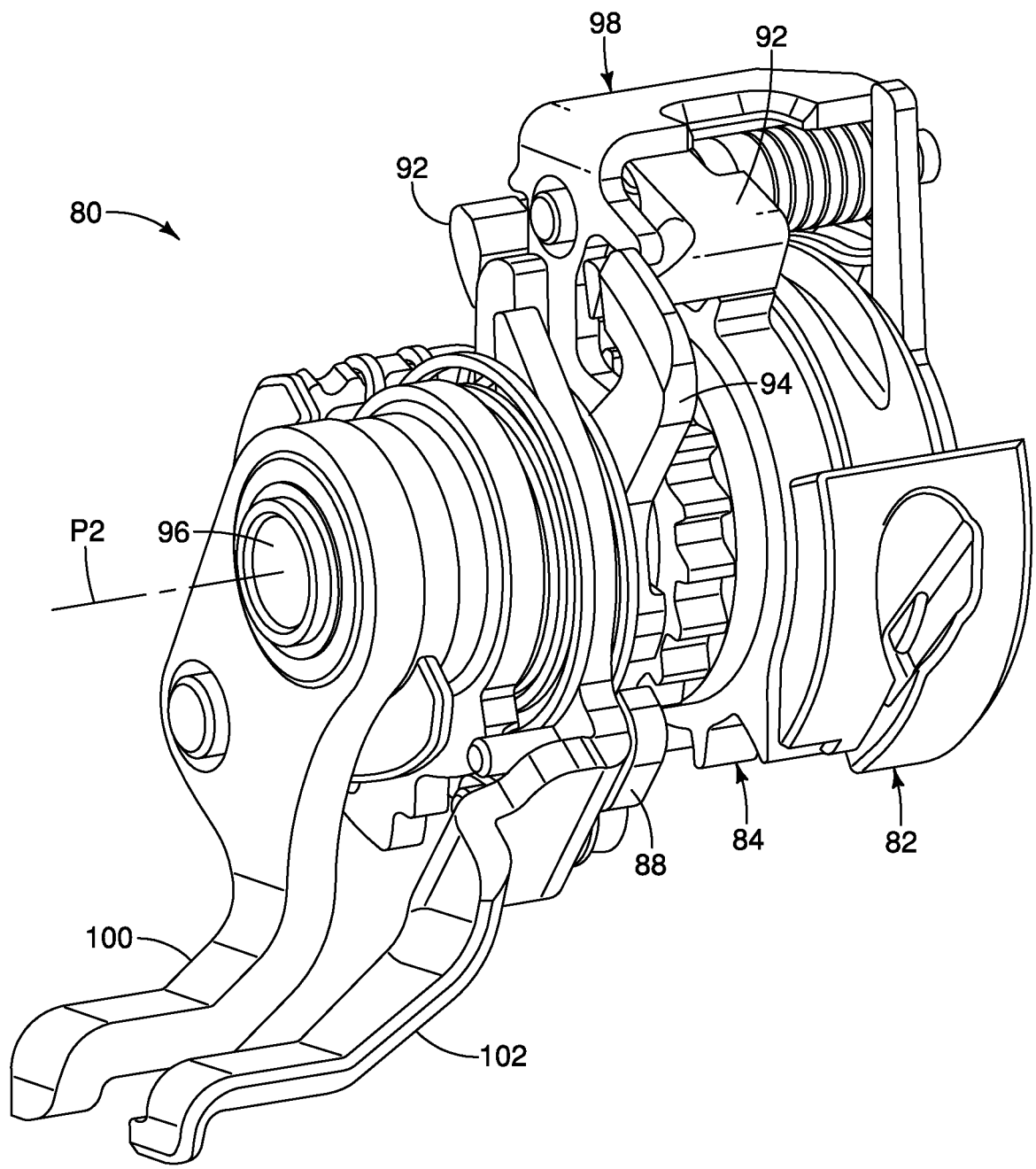
FIG. 26 is another perspective view of the shift unit illustrated in FIG. 25.
Figure 27:
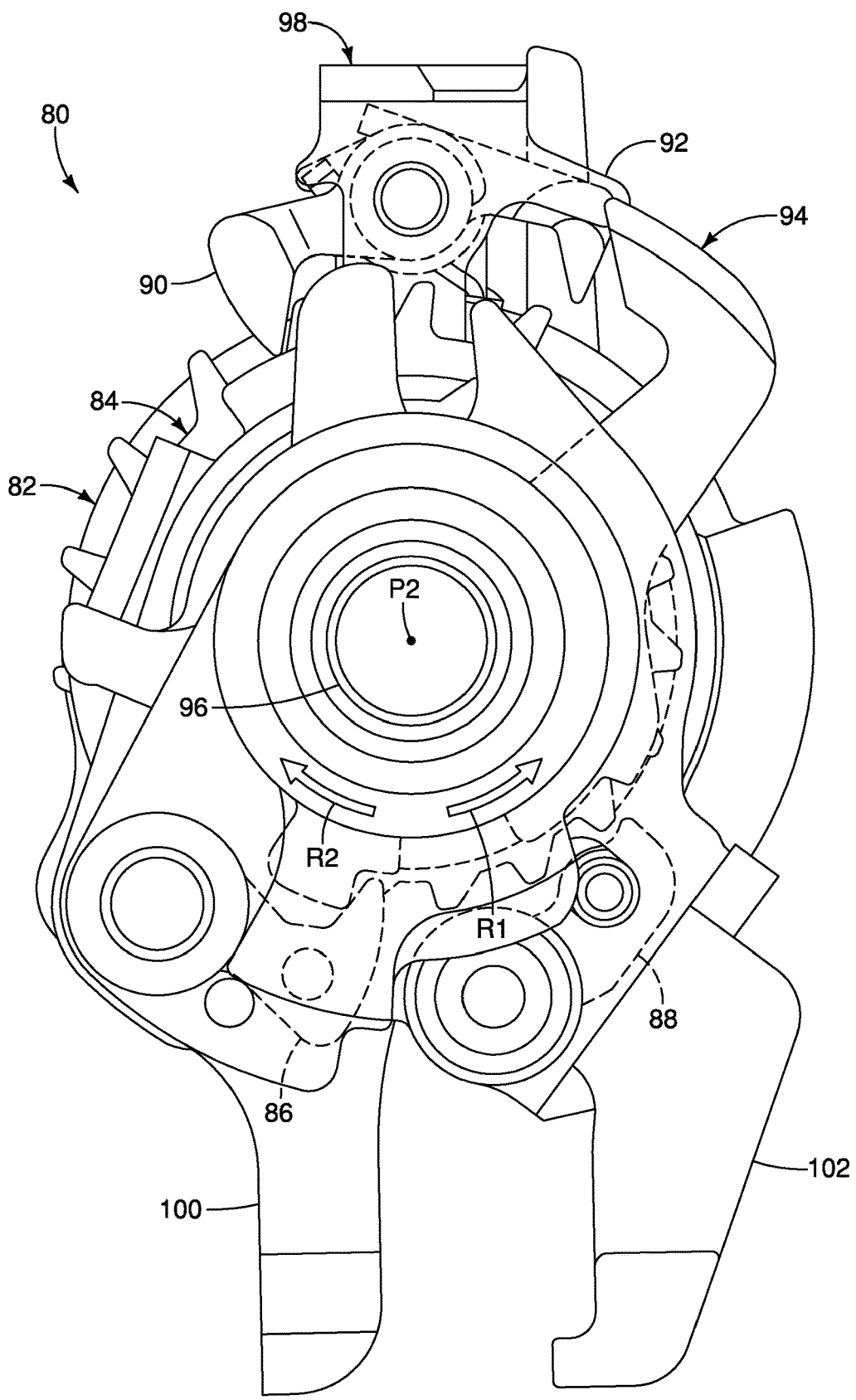
FIG. 27 is front end elevational view of the shift unit illustrated in FIGS. 25 and 26.

Referring to FIGS. 25 to 27, the operating device 10 further comprises a shift unit 80. The shift unit 80 is provided to the base 14. The unit 80 is operated by the operating member 16 being pivoted relative to the adapter 30 about a shift pivot axis P1. Here, the shift unit 80 can also be referred to as a cable operating unit or a component position maintaining mechanism. In response to the operations of the first operating lever 21 and the second operating lever 22, the shift unit 80 pulls and releases the inner wire of the control cable C1 to selectively hold the inner wire of the control cable C1 in one of a plurality of predetermined positions. While the illustrated embodiment is directed to an operating device for shifting a transmission, it will be apparent from this disclosure that the shift unit 80 of the operating device 10 can be used with other components such as a suspension or an adjustable seatpost.

The shift unit 80 of the operating device 10 is one example of a component position maintaining mechanism that can be used with the operating device 10. It will be apparent from this disclosure that other types of component position maintaining mechanisms can be used with the operating device 10 as needed and/or desired. For example, the shift unit 80 is configured to be operated using the first operating lever 21 and the second operating lever 22. However, the shift unit 80 of the operating device 10 can be configured so that the second operating lever 22 is omitted and the first operating lever 21 is used to preform both a cable pulling operation and a cable releasing operation in addition to a braking operation. In other words, the shift unit 80 can be replaced with a shift unit 80 that uses only a single lever for performing both a cable pulling operation and a cable releasing operation in addition to a braking operation. Moreover, the shift unit of the operating device 10 can be any type of position maintaining mechanism as needed and/or desired. Thus, the shift unit 80 will not be described in detail.

In the illustrated embodiment, the shift unit 80 comprises a cable takeup member 82, a positioning ratchet 84, a pulling pawl 86, a release pawl 88, a position maintaining pawl 90, a stop pawl 92 and a release member 94. The cable takeup member 82 is coupled to the positioning ratchet 84 to move with the positioning ratchet 84. The pulling pawl 86, the release pawl 88, the position maintaining pawl 90, the stop pawl 92 and the release member 94 are each a part of the shift unit 80 for controlling the movement of the cable takeup member 82 and the positioning ratchet 84. The shift unit 80 further includes a support axle 96 and a support structure 98. The support structure 98 is non-movably coupled to the support axle 96. In the first embodiment, the support axle 96 is a bolt that is attached to the main body 16.

In this way, the shift unit 80 is supported to the main body 16. The support axle 96 is also provided with various spacers and bushings for properly spacing and rotatably supporting various parts of the shift unit 80. The spacers and bushings are conventional parts that are typically found in shift units. The cable takeup member 82 is rotatably supported to the base 14 by the support axle 96 that defines the shift unit axis P2. The shift unit axis P2 is aligned with the shift pivot axis P1. The support structure 98 is formed of a pair of stationary support members that cooperates with and/or supports other parts of the shift unit 80.

The cable takeup member 82 and the positioning ratchet 84 are movably mounted with respect to the base 14. In particular, the cable takeup member 82 and the positioning ratchet 84 are pivotally supported on the support axle 96. In other words, the cable takeup member 82 and the positioning ratchet 84 are pivotally mounted with respect to the base 14 about the shift unit axis P2. The cable takeup member 82 and the positioning ratchet 84 are configured to be movable in a first rotational direction R1 and a second rotational direction R2 that is opposite the first rotational direction R1 as indicated in FIG. 27. Here, as seen in FIG. 27, the first rotational direction R1 and the second rotational direction R2 are rotational directions that are centered on the shift unit axis P2. However, the shift unit 80 can be reconfigured so that the cable takeup member 82 and the positioning ratchet 84 can be moved in a linear direction. In the illustrated embodiment, the first rotational direction R1 corresponds to a cable pulling direction, while the second rotational direction R2 corresponds to a cable releasing direction. Here, the cable takeup member 82 and the positioning ratchet 84 are biased about the shift unit axis P2 in the second rotational direction R2. Thus, the second rotational direction R2 corresponds to the cable release direction.

As seen in FIG. 26, the cable takeup member 82 includes a cable attachment structure 82a. The cable attachment structure 82a is configured to attach a nipple of the inner wire of the control cable C1 to the cable takeup member 82. Thus, the cable takeup member 82 and the positioning ratchet 84 are configured to pull and release the inner wire of the control cable C1 with respect to the base 14. The first operating lever 21 is operatively coupled to the cable takeup member 82 and the positioning ratchet 84. In particular, the first operating lever 21 is pivotally coupled to the base 14 to pivot about the shift pivot axis P1 to move the cable takeup member 82 and the positioning ratchet 84. Also, the second operating lever 22 is operatively coupled to the positioning ratchet 84. In particular, the second operating lever 22 is also pivotally coupled to the base 14 to pivot about the shift pivot axis P1 to move the cable takeup member 82. Furthermore, the first operating lever 21 is pivotally coupled to the base 14 about the first pivot axis A1 in a state where the cable takeup member 82 remains stationary. In other words, operation of the first operating lever 21 about the first pivot axis A1 does not operate the shift unit 80.

The first operating lever 21 is operatively coupled to the cable takeup member 82 and the positioning ratchet 84. In particular, the first operating lever 21 is pivotally coupled to the base 14 to pivot about the shift pivot axis P1 to move the cable takeup member 82 and the positioning ratchet 84. Also, the second operating lever 22 is operatively coupled to the positioning ratchet 84. In particular, the second operating lever 22 is also pivotally coupled to the base 14 to pivot about the shift pivot axis P1 to move the cable takeup member 82 and the positioning ratchet 84. Thus, a rider changes the current position of the positioning ratchet 84 by selectively operating the first operating lever 21 and the second operating lever 22 about the shift pivot axis P1.

Basically, the pulling pawl 86 is configured to move the cable takeup member 82 and the positioning ratchet 84 in the first rotational direction R1 in response to movement of the first operating lever 21 from the first rest position to the first operated position about the shift pivot axis P1. The pulling pawl 86 is configured to rotate the positioning ratchet 84 such that the positioning ratchet 84 and the cable takeup member 82 rotate in the first rotational direction R1. The release pawl 88 is configured to move the release member 94 to disengage the position maintaining pawl 90 so that the cable takeup member 82 and the positioning ratchet 84 in a second rotational direction R2 in response to movement of the second operating lever 22 from the second rest position to the second operated position about the shift pivot axis P1. In other words, the release pawl 88 is configured to release the positioning ratchet 84 for rotation about the shift unit axis P2 such that the positioning ratchet 84 and the cable takeup member 82 rotate in the second rotational direction R2. The position maintaining pawl 90 is configured to maintain a current position of the positioning ratchet 84. In other words, the position maintaining pawl 90 is configured to engage the positioning ratchet 84 to hold the positioning ratchet 84 from moving while the first operating lever 21 and the second operating lever 22 are in their rest positions. Thus, the positioning ratchet 84 cooperates with the position maintaining pawl 90 to hold the inner wire of the control cable C1 at one of the predetermined positions. The stop pawl 92 is configured to engage the positioning ratchet 84 to limit the movement of the positioning ratchet 84 during a cable releasing operation using the second operating lever 22.

The release member 94 is pivotally supported on the support axle 96. The release member 94 is pivoted by the release pawl 88 about the shift unit axis P2 in the first rotational direction R1 in response to operation of the second operating lever 22 about the shift pivot axis P1. The release member 94 is configured to move in the first rotational direction R1 from a non-releasing position towards a releasing position to selectively move the position maintaining pawl 90 between a maintaining position and a releasing position. In the maintaining position, the position maintaining pawl 90 is engaged with the positioning ratchet 84 to maintain the current position of the positioning ratchet 84. In the positioning ratchet 84, the position maintaining pawl 90 is pivoted out of engagement from the positioning ratchet 84 to allow the positioning ratchet 84 and the cable takeup member 82 to rotate in the second rotational direction R2 under the biasing force of the biasing member 58. However, the release member 94 also pivots the stop pawl 92 into engagement with the positioning ratchet 84 to limit the rotation of the positioning ratchet 84 and the cable takeup member 82 in the second rotational direction R2. Thus, operation of the second operating lever 22 causes the positioning ratchet 84 and the cable takeup member 82 to rotate in the second rotational direction R2, which corresponds to the cable releasing direction, for releasing the inner wire of the control cable C1.

In the first embodiment, the shift unit 80 further comprises a first input member 100 and a second input member 102. Basically, the first input member 100 and the second input member 102 are pivotally supported on the support axle 96. Here, the first input member 100 and the second input member 102 are biased about the shift unit axis P2 in the second rotational direction R2. The pulling pawl 86 is pivotally mounted on the first input member 100. The release pawl 88 is pivotally mounted on the second input member 102. The second input member 102 moves with the first input member 100 as the first input member 100 moves from the rest position of the first input member 100 towards the operated position of the first input member 100. On the other hand, normally, the first input member 100 remains stationary as the second input member 102 moves from the rest position of the second input member 102 towards the operated position of the second input member 102. However, it is possible that the user may accidently push the first operating lever 21 when the user is moving the second operating lever 22 from its rest position towards its operated position. In this situation, the first input member 100 could initially move with the second input member 102.

Basically, the first input member 100 is pivoted about the shift unit axis P2 in the first rotational direction R1 in response to operation of the first operating lever 21 about the shift pivot axis P1. As the first input member 100 pivots about the shift unit axis P2 in the first rotational direction R1, the pulling pawl 86 engages the positioning ratchet 84 in response to operation of the first operating lever 21 about the shift pivot axis P1. In this way, the pulling pawl 86 initiates a pulling operation of the positioning ratchet 84 and the cable takeup member 82 in the first rotational direction R1. Thus, operation of the first input member 100 by the first operating lever 21 causes the cable takeup member 82 to rotate in the first rotational direction R1, which corresponds to the cable pulling direction, for pulling the inner wire of the control cable C1.

On the other hand, the second input member 102 is pivoted about the shift unit axis P2 in the first rotational direction R1 in response to operation of the second operating lever 22 about the shift pivot axis P1. As the second input member 102 pivots about the shift unit axis P2 in the first rotational direction R1, the release pawl 88 releases the positioning ratchet 84 in response to operation of the second operating lever 22 about the shift pivot axis P1. In this way, the release pawl 88 initiates a releasing operation of the positioning ratchet 84 and the cable takeup member 82 in the second rotational direction R2. Thus, operation of the second input member 102 by the second operating lever 22 causes the cable takeup member 82 to rotate in the second rotational direction R2, which corresponds to the cable releasing direction, for releasing the inner wire of the control cable C1.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the operating device. Accordingly, these directional terms, as utilized to describe the operating device should be interpreted relative to a human-powered vehicle (e.g., bicycle) in an upright riding position on a horizontal surface and that is equipped with the operating device. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time.

Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device for a human-powered vehicle, the operating device comprising:
   a base including a first end, a second end, and a grip portion, the first end being configured to be coupled to the handlebar, the second end being opposite to the first end, the grip portion being provided between the first end and the second end;
   an operating member pivotally mounted to the base about a first pivot axis;
   a hydraulic unit provided to the base and operated by the operating member, the hydraulic unit including a cylinder bore and a piston movably provided in the cylinder bore; and
   an intermediate member movably coupled to the operating member to move the piston relative to the base from an initial position to an actuated position in response to a movement of the operating member from a rest position to an operating position, the intermediate member being pivotally mounted to the base about a second pivot axis,
   the piston being closer to the second end where the piston is at the initial position than where the piston is at the actuated position,
   the cylinder bore being at least partly closer to the second end than the first pivot axis, and the intermediate member being at least partly closer to the second end than the first pivot axis.

2. The operating device according to claim 1, wherein the second pivot axis is closer to the second end than the first pivot axis.

3. The operating device according to claim 1, wherein the intermediate member includes a pivot portion pivotally mounted to the base, a first arm portion extending from the pivot portion in a first direction, and a second arm portion extending from the pivot portion in a second direction that is different from the first direction as viewed in a direction parallel to the first pivot axis.

4. The operating device according to claim 3, wherein the first arm portion is operatively coupled to the operating member, and
the second arm portion is operatively coupled to the piston.

5. The operating device according to claim 4, wherein the first arm portion is operatively coupled to the operating member by a cam structure.

6. The operating device according to claim 4, wherein the second arm portion is operatively coupled to the piston by a push rod.

7. The operating device according to claim 4, wherein the first arm portion extends towards the first end where the piston is at the initial position, and
the second arm portion extends towards the second end where the piston is at the initial position.

8. The operating device according to claim 1, further comprising
a first biasing element configured to bias the piston towards the initial position.

9. The operating device according to claim 8, further comprising
a second biasing element configured to bias the operating member towards the operating position.

10. The operating device according to claim 9, wherein the second biasing element has a lower biasing force than the first biasing element.

11. The operating device according to claim 1, wherein the operating member is configured to operate a brake device while the operating member in the operating position.

12. The operating device according to claim 1, further comprising
an adapter through which the operating member is pivotally coupled to the base about the first pivot axis.

13. The operating device according to claim 12, further comprising
a shift unit provided to the base and operated by the operating member being pivoted relative to the adapter about a shift pivot axis.

14. An operating device for a human-powered vehicle the operating device comprising:
   a base including a first end, a second end, and a grip portion, the first end being configured to be coupled to the handlebar, the second end being opposite to the first end, the grip portion being provided between the first end and the second end;
   an operating member pivotally mounted to the base about a first pivot axis;
   a hydraulic unit provided to the base and operated by the operating member, the hydraulic unit including a cylinder bore and a piston movably provided in the cylinder bore; and
   an intermediate member movably coupled to the operating member to move the piston relative to the base from an initial position to an actuated position in response to a movement of the operating member from a rest position to an operating position,
   the piston being closer to the second end where the piston is at the initial position than where the piston is at the actuated position,
   the cylinder bore being at least partly closer to the second end than the first pivot axis, and the intermediate member being at least partly closer to the second end than the first pivot axis,
   the operating member including a cam surface, and
   the intermediate member including a follower configured to contact the cam surface such that the movement of the operating member from the rest position to the operating position causes the intermediate member to move the piston from the initial position to the actuated position with a variable lever stroke to piston stroke ratio.

15. The operating device according to claim 14, wherein the follower includes a cam roller.

16. An operating device for a human-powered vehicle the operating device comprising:
   a base including a first end, a second end, and a grip portion, the first end being configured to be coupled to the handlebar, the second end being opposite to the first end, the grip portion being provided between the first end and the second end;
   an operating member pivotally mounted to the base about a first pivot axis;

a hydraulic unit provided to the base and operated by the operating member, the hydraulic unit including a cylinder bore and a piston movably provided in the cylinder bore; and an intermediate member movably coupled to the operating member to move the piston relative to the base from an initial position to an actuated position in response to a movement of the operating member from a rest position to an operating position, the piston being closer to the second end where the piston is at the initial position than where the piston is at the actuated position, the cylinder bore being at least partly closer to the second end than the first pivot axis, and the intermediate member being at least partly closer to the second end than the first pivot axis, the cylinder bore having a center longitudinal axis that is offset from a center plane to a first lateral side, where the center plane bisects the first end in a widthwise direction of the base as viewed in a direction parallel to the center plane.

17. The operating device according to claim 16, wherein the base includes an outlet port and a hydraulic passageway connecting the outlet port to the cylinder bore, and the outlet port and the hydraulic passageway are located on the first lateral side.

18. An operating device for a human-powered vehicle, the operating device comprising:

a base including a first end, a second end, and a grip portion, the first end being configured to be coupled to the handlebar, the second end being opposite to the first end, the grip portion being provided between the first end and the second end;

an operating member pivotally mounted to the base about a first pivot axis;

a hydraulic unit provided to the base and operated by the operating member, the hydraulic unit including a cylinder bore and a piston movably provided in the cylinder bore;

an intermediate member movably coupled to the operating member to move the piston relative to the base from an initial position to an actuated position in response to a movement of the operating member from a rest position to an operating position;

a first pivot axle pivotally supporting the operating member to the base;

a second pivot axle pivotally supporting the intermediate member to the base; and a brace coupled to the first pivot axle and the second pivot axle, the piston being closer to the second end where the piston is at the initial position than where the piston is at the actuated position, the cylinder bore being at least partly closer to the second end than the first pivot axis, and the intermediate member being at least partly closer to the second end than the first pivot axis.

19. The operating device according to claim 18, wherein the base is made of a non-metallic material, and the brace is made of a metallic material.

* * * * *